US008408229B2

(12) United States Patent
Goldberg et al.

(10) Patent No.: US 8,408,229 B2
(45) Date of Patent: Apr. 2, 2013

(54) PLANT WATERING SYSTEM

(75) Inventors: Leonard Goldberg, East Syracuse, NY (US); James P. Romano, Syracuse, NY (US); John J. Feketa, Clinton, NY (US)

(73) Assignee: Federal Pacific Trading, Inc., East Syracuse, NY (US)

( * ) Notice: Subject to any disclaimer, the term of this patent is extended or adjusted under 35 U.S.C. 154(b) by 380 days.

(21) Appl. No.: 12/538,900

(22) Filed: Aug. 11, 2009

(65) Prior Publication Data

US 2009/0293354 A1 Dec. 3, 2009

Related U.S. Application Data

(63) Continuation-in-part of application No. 11/277,801, filed on Mar. 29, 2006, now Pat. No. 7,607,257.

(60) Provisional application No. 60/089,046, filed on Aug. 14, 2008.

(51) Int. Cl.
*A01G 29/00* (2006.01)
(52) U.S. Cl. ............................ 137/78.3; 47/48.5; 47/79
(58) Field of Classification Search .................. 137/78.2, 137/78.3; 73/73; 47/79, 48.5
See application file for complete search history.

(56) References Cited

U.S. PATENT DOCUMENTS

| | | | | |
|---|---|---|---|---|
| 4,693,419 A * | 9/1987 | Weintraub et al. | ............. | 239/63 |
| 4,937,972 A * | 7/1990 | Freitus | ............. | 47/62 R |
| 5,060,859 A * | 10/1991 | Bancroft | ............. | 239/64 |
| 5,315,787 A * | 5/1994 | Schleicher et al. | ............. | 47/79 |
| 5,341,831 A * | 8/1994 | Zur | ............. | 137/78.3 |
| 5,749,521 A * | 5/1998 | Lattery | ............. | 239/64 |
| 5,813,605 A * | 9/1998 | Chou | ............. | 239/64 |
| 6,756,793 B2 * | 6/2004 | Hirono et al. | ............. | 324/690 |
| 7,110,862 B2 * | 9/2006 | Park | ............. | 700/284 |

* cited by examiner

*Primary Examiner* — Craig Schneider
(74) *Attorney, Agent, or Firm* — The Law Offices of Anthony L. Meola

(57) ABSTRACT

An automatic plant watering apparatus having a cavity for receiving a standard houseplant pot, a reservoir for holding water, a pump for removing water from the reservoir, a host for delivering water from the pump to a plant positioned in the cavity. The pump is operated by a microcontroller that is programmed to measure a first time period during which the pump is not operated, and a second time period during which the pump is operated. According, the apparatus can be programmed to automatically water a house plant at predetermined intervals, as well as deliver a predetermined amount of water.

17 Claims, 17 Drawing Sheets

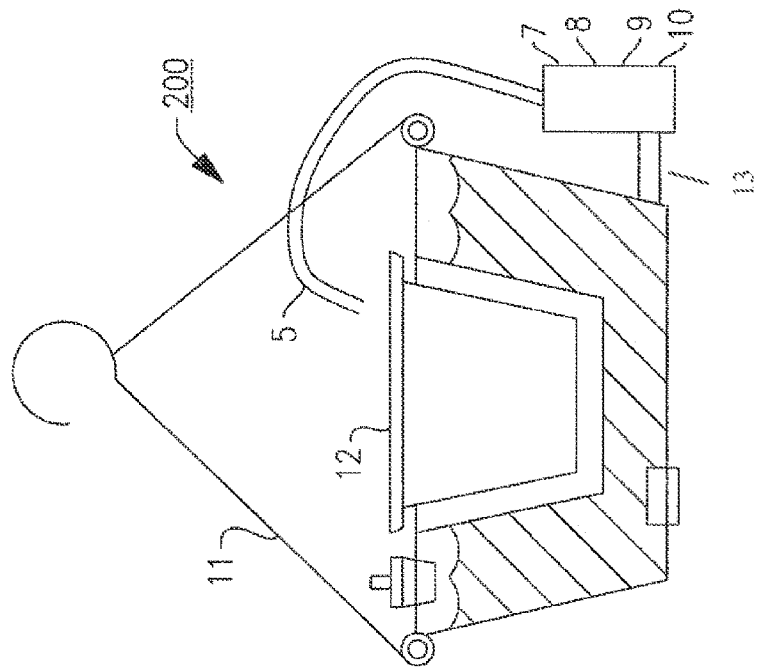
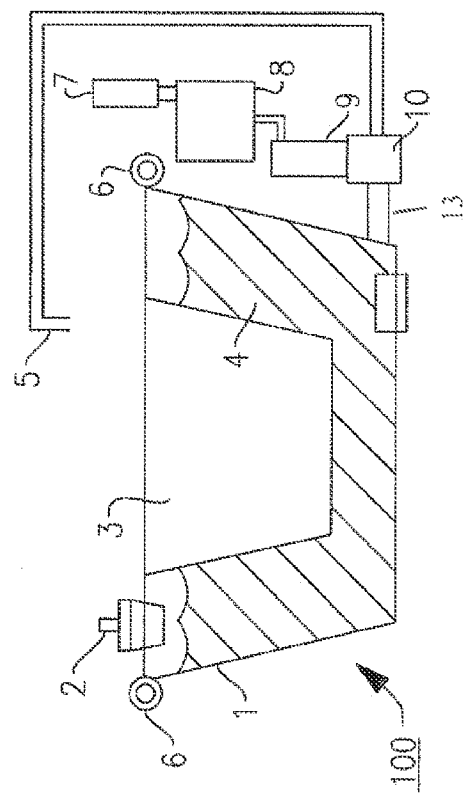
FIG. 1A
FIG. 1B

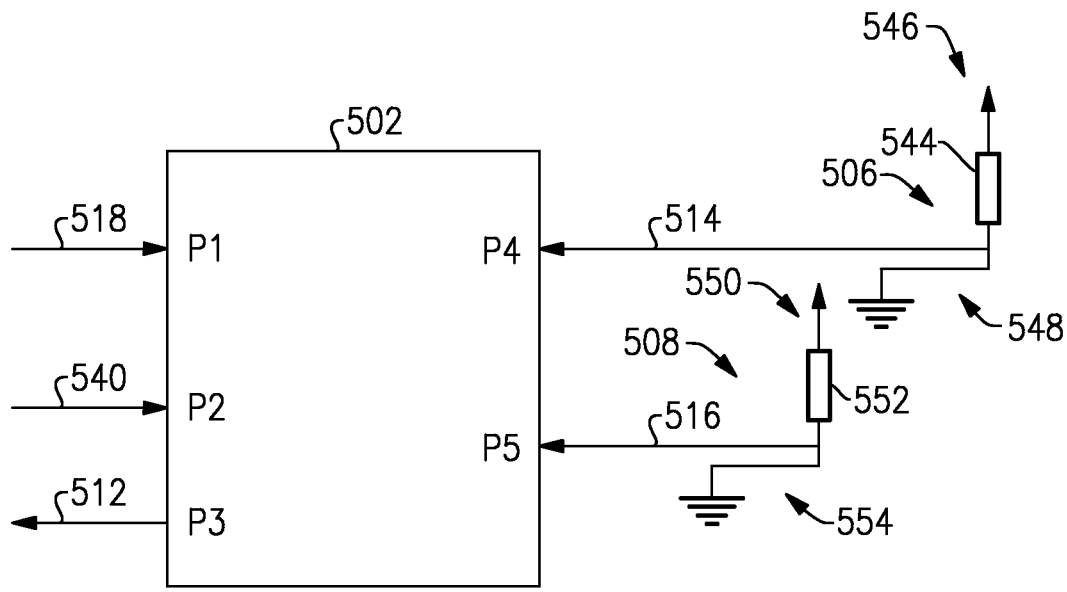
FIG. 6
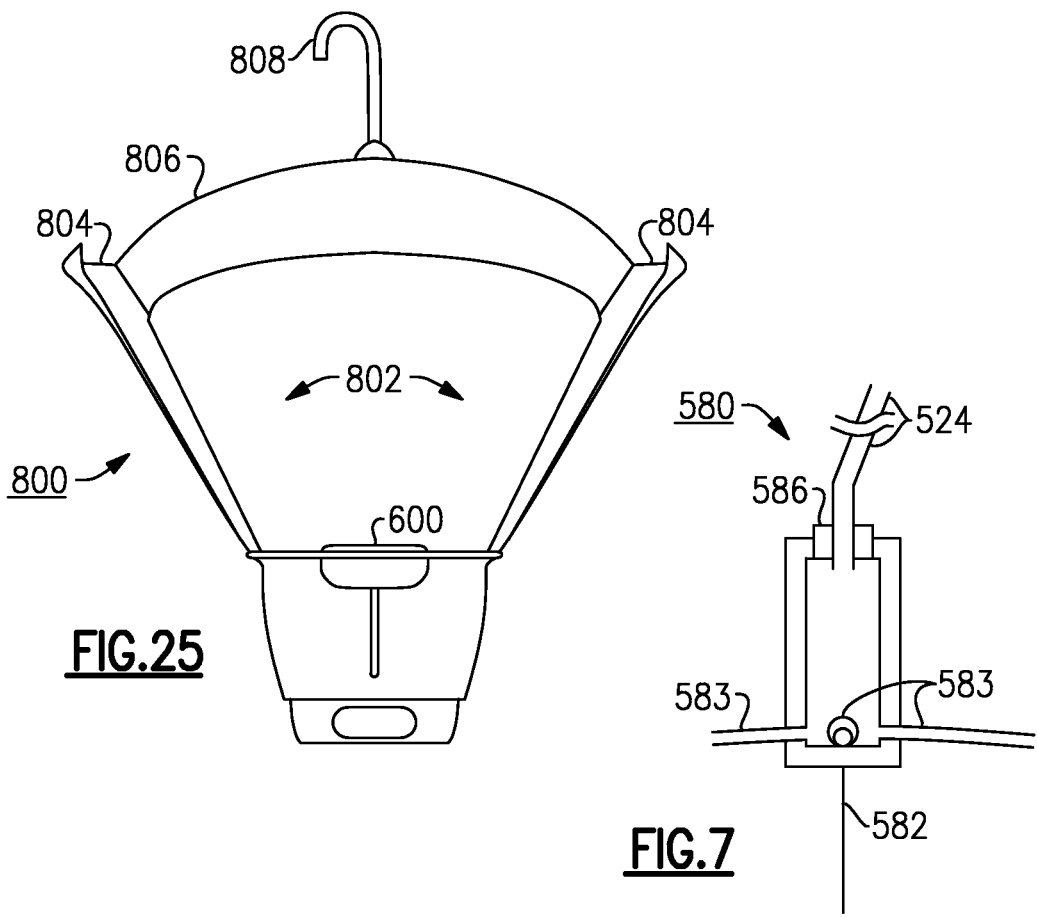
FIG. 25
FIG. 7

560 Element 1 probe body
561 Element 2 insulator
562 Element 3 2 wire cable
563 Element 4 Probe tip
564 Element 5 2 wire connector

PLANT WATERING SYSTEM

CROSS REFERENCE TO RELATED APPLICATIONS

This application also takes priority U.S. Provisional Patent Application Ser. No. 60/089,046, entitled "PLANT WATERING SYSTEM", filed Aug. 14, 2008. This application is incorporated by reference herein, in its entirety.

This application takes priority from and is a continuation-in-part of co-owned, and co-invented U.S. patent application Ser. No. 11/277,801, entitled "AUTOMATIC WATERING APPARATUS FOR HOUSEPLANTS", filed Mar. 29, 2006 now U.S. Pat. No. 7,607,257. This application is incorporated by reference herein, in its entirety.

BACKGROUND OF THE INVENTION

1. Field of the Invention

The invention relates generally to the field of horticulture and more specifically to plant watering systems ("PWS", see Definitions section).

2. Description of the Related Art

Many PWSs are conventional. PWSs with planters (see Definition of PWS) that include certain types of soil moisture sensors and/or various other features are conventional. Irrigation type PWSs (see Definition of PWS) that include certain types of soil moisture sensors and/or various other features are conventional. Some existing publications relating to PWSs with planters and to irrigation type PWSs will now be discussed.

U.S. Pat. No. 4,001,967 ("Swift") discloses a self-watering planter including an inner shell, an outer shell and a reservoir tank formed by and located between the two shells. Water is fed from the reservoir to soil and plants within the inner shell by vacuum control and capillary action. Swift also discloses a water level indicating plug built into an exterior surface of its reservoir tank. The plug of Swift is tapered and transparent, and it is constructed so that more ambient light will be reflected toward users if the reservoir water level is below the height of the plug than when the water level is above the height of the plug. This provides the user with a visual indication of the water level in the reservoir of the self-watering planter of Swift.

U.S. Pat. No. 4,241,538 ("Lahr") discloses a device for automatically watering plant containers including a supply hose threaded through a pair of resilient members. A planter with soil is placed on top of the resilient members. When the soil is relatively wet, the weight of the planter forces the resilient members, against their bias, into a closed position, whereby the resilient members squeeze shut the supply hose and cut off the water supply. When the soil is dry, the bias of the resilient members forces them into an open position, whereby the supply hose is no longer squeezed or pinched shut by the resilient members and water can flow through the supply hose to the dry soil.

U.S. Pat. No. 4,829,709 ("Centafanti") discloses a planter including an upper receptacle that holds soil and a plant and a lower receptacle which is a reservoir that holds water. Under appropriate soil moisture conditions in the upper receptacle, a wick member draws water up from the lower receptacle into the upper receptacle to water the plant.

U.S. Pat. No. 4,834,265 ("Snyder") discloses a PWS for decorative plants including a water source, a water pump, water distribution tubing and a plurality of plant pots. The Snyder system has adjustable timing of the watering, water distribution tubing with multiple branches for multiple plants and valves to prevent flooding. The water distribution tubing of the Snyder system also includes a pressure sensor to sense water pressure in the tubing as a diagnostic measure.

U.S. Pat. No. 4,873,790 ("Laterza") discloses a plant spinner designed to rotate potted plants so as to evenly expose various portions of the plant to the rays of the sun.

U.S. Pat. No. 4,850,386 ("Birely") discloses a PWS with a monitor for sensing the moisture content of a surrounding medium, the monitor including two electrodes connected in a detector circuit for detecting the impedance between the electrodes. Because Birely uses an inductive detector, its monitor also includes an oscillator which is disclosed to have an operating frequency of no greater than 20 KHz.

U.S. Pat. No. 4,937,972 ("Freitus") discloses a planter including a lower compartment for housing an electric pump and battery power source, an intermediate reservoir compartment for storing growth solution, and an upper compartment for holding soil and a plant. The pump selectively waters the plant with growth solution from the intermediate compartment. The upper compartment contains a sensor switch assembly that, depending on the quantity of fluid contained in the upper compartment, water switches on and off the electrical connection between the battery power source and the pump. In other words, this sensor/switch assembly causes the pump to switch on and off and thereby controls the selective watering of the plant. The sensor/switch assembly is located inside the upper compartment and can include resistive, capacitive, optical or other detectors for sensing the level of fluid the upper compartment. Alternatively, the Freitus system may utilize conventional electronic moisture sensors for measuring the amount of moisture present in the soil contained in the upper compartment.

U.S. Pat. No. 5,097,626 ("Mordoch") discloses a PWS with a variable vacuum moisture sensor, located in the soil in the vicinity of a plant's root. Based on operation of the moisture sensor, the Mordoch PWS opens and closes a watering tube with variations in pressure created by the variable vacuum.

U.S. Pat. No. 5,749,170 ("Furuta") discloses a couple of embodiments of a PWS with a planter, specifically a pot-shaped case having a space shaped and sized to hold a flowerpot therein. One embodiment of Furuta PWS (see Furuta at FIGS. 1-3 and associated discussion) further includes a moisture sensor that is placed in the soil of the flowerpot. The automatic plant watering operation of Furuta is controlled by a controller using input from the soil moisture sensor and also input from a timer. Another embodiment of Furuta (see Furuta at FIGS. 5-14 and associated discussion) includes three water level sensors S1, S2, S3. Sensors S1 and S2 are disclosed to be located in the interior space of a water tank located around the peripheral wall of the flowerpot, and to sense the level of water in the water tank. Furuta does not disclose any details about how its soil moisture sensors or water tank level sensors operate, such as whether they are electrical or optical.

U.S. Pat. No. 5,956,899 ("DiOrio") discloses a PWS with a planter and a reservoir. The DiOrio PWS includes a porous ceramic moisture sensor. The DiOrio moisture sensor located at the distal end of a vent tube so that it can be placed at various levels in the soil of the planter so as to vary the level of wetness or dryness for a particular plant.

U.S. Pat. No. 7,222,454 ("Chen") discloses a PWS including plant pots, a reservoir, a submersible pump, discharge hoses and soaker hoses. Chen also includes a sensor for detecting a low water level in the reservoir. Chen does not disclose any details about how its reservoir level sensor operates.

U.S. published application 2003/0140557 ("Lyon") discloses a self-regulating watering system including a modular reservoir. The amount of watering is regulated by an air seal that seals upon a moist condition such that air can no longer enter the reservoir. This creates a vacuum, of sorts, and stops the flow of water out of the reservoir until the air seal becomes dry and again opens.

U.S. published application 2004/0059509 ("Anderson") discloses a soil moisture sensor. In its Background section, Anderson states the following in regard to certain types of soil moisture sensors: "A variety of sensors have been developed to detect moisture in various media. These include conductivity sensors, bulk dielectric constant sensors, time domain reflectometer or transmissometer (TDR or TDT) type sensors, and various oscillator devices, the majority of which exploit the high dielectric constant of water to extrapolate moisture content in the medium. In particular, TDR type sensors have been used over the past several years to measure the water content in various applications. Such applications include detecting volumetric soil moisture, determining liquid levels in tanks, and determining moisture content in paper mills and granaries. A major setback in determining volumetric moisture content in a medium is the influence of conductive materials in the medium of interest. For example, soil conductivity is a function of the ion content of the soil and of its temperature. Salts from irrigation water and/or fertilizer can build up in the soil and cause significant errors in TDR-based moisture readings. Because of the uncertainty in moisture readings caused by conductivity, many of the TDR sensors now available are 'relative' sensors. This means that the sensor does not report absolute moisture content readings, but uses reference points obtained through testing. In essence, the moisture sensor does not report absolute moisture content readings, but reports a 'wetter than' or 'drier than' condition based on the relative difference of the conductivity-dependent moisture content reading and the reference reading. Unfortunately, the readings from these 'relative' sensors do not remain in synchronism with the true or 'absolute water content of the medium, but fluctuate with time. For example, the salinity (ionic content) of soil may fluctuate with season. In such a case, the original reference point becomes an inaccurate indicator of the moisture level of the medium."

With respect to this discussion of "relative" soil moisture sensors in Anderson, it is noted that the sensors there under discussion there are TDT and TDR type sensors and are not simple, resistive soil moisture sensors. The TDR (or Time Domain Reflectometer) is a resistive type sensor whose operation and discussed at the published Wikipedia website http://en.wikipedia.org/wiki/Time-domain_reflectometer as of 23 Oct. 2007: "A time-domain reflectometer (TDR) is an electronic instrument. A TDR transmits a fast rise time pulse along [a] conductor. If the conductor is of a uniform impedance and properly terminated, the entire transmitted pulse will be absorbed in the far-end termination and no signal will be reflected back to the TDR. But where impedance discontinuities exist, each discontinuity will create an echo that is reflected back to the reflectometer (hence the name). Increases in the impedance create an echo that reinforces the original pulse while decreases in the impedance create an echo that opposes the original pulse. The resulting reflected pulse that is measured at the output/input to the TDR is displayed or plotted as a function of time and, because the speed of signal propagation is relatively constant for a given transmission medium, can be read as a function of cable length. This is similar in principle to radar. TDR is used to determine soil moisture water content in porous media, where over the last two decades substantial advances have been made; including in soils, grains and food stuffs, and in sediments. The key to TDR's success is its ability to accurately determine the permittivity (dielectric constant) of a material from wave propagation, and the fact that there is a strong relationship between the permittivity of a material and its water content, as demonstrated in the pioneering works of Hoekstra and Delaney (1974) and Topp et al. (1980). The TDR method is a transmission line technique, and determines an apparent TDR permittivity (Ka) from the travel time of an electromagnetic wave that propagates along a transmission line, usually two or more parallel metal rods embedded in a soil or sediment. TDR probes are usually between 10 and 30 cm in length and connected to the TDR via a coaxial cable."

To put it more simply, TDR uses the affect that a resistance of the soil will have on the time it takes to transmit a propagating wave in a conductor. This requires complex equipment to generate the appropriate pulses, to measure received reflections, to measure times and to analyze and interpret the results.

U.S. published application 2005/0199842 ("Parsons") discloses an irrigation system including a soil moisture sensor. The Parsons system is designed to water large areas such as parks, golf courses or agricultural fields. The soil moisture sensor uses a chamber formed by membranes which is buried in the soil and detects moisture through detection of pressure and hygroscopic force.

U.S. published application 2005/0240313 ("Cartwright") discloses a PWS including a digital moisture monitor. The digital moisture monitor includes two alternating current (AC) conduction type moisture sensors. Each AC sensor includes two probe tips which will transfer energy therebetween at a rate determined by the moisture content of the soil.

U.S. published application 2006/0290360 ("Lee") discloses a capacitive soil moisture sensor for use in an irrigation system. Two electrodes are inserted into the soil to form a capacitor with the soil therebetween acting as the dielectric. A change in soil moisture causes the capacitance of the capacitor to change.

U.S. published application 2007/0145984 ("McDermid") discloses a soil moisture sensor system configured to receive soil between parallel plates. A processor determines soil moisture content based on capacitive measurement taken between the parallel plates.

There are many kinds of "absolute" soil moisture sensors that operate by directly measuring the amount of moisture in the soil, rather than using a measure relative to a calibrated value or values set by the users. Some absolute soil moisture sensors are disclosed in the following articles: (i) "Aqua Pro Sensors A Complete Moisture Sensing And Control System" published at http://www.aquapro-sensors.com as of 10 Oct. 2007; (ii) "Theory Of ECH$_2$0 Probes' Operation" published at http://www.decagon.com/Ech20/theory as of 10 Oct. 2007; (iii) "Monitoring Temporal Soil Moisture Variability With Depth Using Calibrated In-Situ Sensors" by Hymer et al. published at http://www.tucson.ars.ag.gov/salsa! archive/publications/ams-preprints/hymer.html (discloses a resistive type of sensor that uses TDR technology); (iv) "Using Soil Moisture Sensors for Making Irrigation Management Decisions in Virginia" by Thomson et al. published at http://www.ext.vt.edu/pubs/rowcrop/442-024/442-024.html#L2.plates.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY OF THE INVENTION

The present invention includes an automatic plant watering apparatus having a cavity for receiving a standard houseplant pot, a reservoir for holding water, a pump for removing water from the reservoir, a host for delivering water from the pump to a plant positioned in the cavity. The pump is operated by a microcontroller that is programmed to measure a first time period during which the pump is not operated, and a second time period during which the pump is operated. Accordingly, the apparatus can be programmed to automatically water a house plant at predetermined intervals, as well as deliver a predetermined amount of water.

One aspect of the present invention is directed to a PWS including a soil moisture detector that indirectly measures soil moisture by measuring the electrical resistance of the soil across two conductors placed in the soil at a calibration point selected by the user, and then measuring the electrical resistance across the conductors in the soil at later times. Soil moisture is determined in an indirect way by comparing the later resistance reading to the resistance reading determined at the calibration point. It is also simple for the user to recalibrate the soil moisture detector if is impacted over time by distortions in soil electrical resistance due to ionization, salination or the like. Preferably the calibration point is set when the soil is at a medium moisture level, but, alternatively, a dry calibration point, a wet calibration point or multiple calibration points may be used.

Preferably, the PWS would further include a built-in reservoir and an electric pump for watering the plants planted therein under control of the processor. The processor helps with the soil moisture detection by storing the resistance level at the calibration points and by comparing resistances detected after the calibration to the resistance at the calibration point. The processor preferably utilizes the indirectly determined soil moisture level to selectively add additional water to the plants and/or to provide an indication (for example, a visual indication) of moisture level to users of the PWS.

Another aspect of the present invention is directed to a planter assembly including a reservoir level detector that measures electrical resistance at a threshold height in the reservoir to provide information about fluid level in the reservoir. Based on the resistance measured by the reservoir level detector a processor can determine whether fluid level in the reservoir has dropped below the operative height of the reservoir level detector, thereby indicating a low fluid condition in the reservoir. Preferably, the planter assembly would further include a low reservoir indicator (for example, a visual indicator, a sonic indicator) to indicate to users of the planter assembly that the fluid level is low and that the reservoir should be refilled.

Another aspect of the present invention is directed to a PWS including a reservoir, a pump for pumping water out of the reservoir and to the vicinity of the roots of any plants planted in the planter assembly, a battery for driving the pump and a battery energy level detector for detecting a low energy condition in the battery. Preferably, the planter assembly would further include a low battery indicator (for example, a visual indicator, a sonic indicator) to signal to users of the planter assembly that the battery energy level is low and that the battery should be recharged and/or replaced.

Another aspect of the present invention is directed to a user-actuated switch including a switching mechanism, where interaction of the magnetic fields of a magnetic key and a sliding magnet selectively push down (that is, activate) a push button switch on a printed circuit board (PCB).

Another aspect of the present invention is directed to a PWS including a planter and an umbrella (preferably transparent) disposed at least substantially over the plant chamber to keep out precipitation. Preferably, the umbrella includes a hanging fastener adapted to that the portable planter assembly can be hung from an external member through the hanging fastener. Preferably, the portable planter includes a reservoir and its umbrella further includes a fluid guide adapted to guide fluid that falls on the umbrella (for example, rain) to be directed into the reservoir.

Various embodiments of the present invention may exhibit one or more of the following objects, features and/or advantages:

(1) improved detection of a low soil moisture condition in a planter assembly;

(2) improved detection of a low reservoir level condition in a planter assembly;

(3) improved detection of a low battery energy condition in a planter assembly;

(4) a user-actuated switch improved in operation and/or reliability;

(5) a waterproof switch improved in cost effectiveness;

(6) a portable planter assembly with improved hanging means;

(7) a portable planter assembly with improved thermal and/or optical performance; and (8) a portable planter assembly with improved control over moisture level in its plant chamber by blocking rain from reaching the plant chamber; and (9) a portable planter assembly that can use rainwater to help refill its reservoir.

According to one aspect of the present invention, a PWS for providing fluid to plants planted in soil, includes a fluid providing structure, a probe structure, a resistance measuring structure, an input structure and a controller structure. The fluid providing structure selectively provides fluid to the soil. The probe structure, includes an end, a first conductor including a first conductor portion and a second conductor comprising a second conductor portion. The probe structure maintains the first conductor portion and the second conductor portion in a spaced apart relationship proximate to the end so that soil surrounds said first conductor portion and the second conductor portion when the end of the probe structure is placed in the soil. The resistance measuring structure effectively determines (see Definitions section) the electrical resistance between the first conductor portion and the second conductor portion. The input structure allows a user to choose a calibration point in time. The controller structure: (i) controls the selective provision of fluid by the fluid providing structure, (ii) at the calibration point, controls the resistance measuring structure to effectively determine a calibration resistance to be received by and stored in the controller structure, (iii) subsequent to the calibration point, controls the resistance measuring structure to effectively determine a subsequent resistance to be received by the controller structure, and (iv) compares the subsequent resistance to the calibration resistance to determine information about the soil moisture level.

According to a further aspect of the present invention, a PWS for providing fluid to plants planted in soil includes a reservoir structure, a fluid providing structure, a reservoir level detector structure, a resistance measuring structure, and a controller structure. The reservoir structure holds fluid away from the soil. The fluid providing structure includes a fluid conduit structure adapted to guide fluid from the reservoir structure to the vicinity of the soil. The fluid providing structure further includes a pump structure that selectively pumps fluid through the fluid conduit structure from the reservoir structure to the vicinity of the soil. The reservoir level detector structure includes a first conductor having a first conductor portion, and a second conductor having a second conductor portion. The reservoir level detector structure maintains the first conductor portion and the second conductor portion in a spaced apart relationship so that fluid surrounds the first conductor portion and the second conductor portion when the reservoir structure has at least a predetermined volume of fluid held therein. The resistance measuring structure effectively determines the electrical resistance between the first conductor portion and the second conductor portion. The controller structure: (i) controls the selective pumping of fluid by the pump structure; (ii) controls the resistance measuring structure to effectively determine a reservoir resistance between the first conductor portion and the second conductor portion; and (iii) compares the reservoir resistance to a predetermined threshold value to determine whether the fluid level in the reservoir is low.

According to a further aspect of the present invention, a PWS for providing fluid to plants planted in soil includes a reservoir structure, a fluid providing structure, a battery (see Definitions section), a battery level detector, a controller structure and an indicator structure. The reservoir structure holds fluid away from the soil. The fluid providing structure includes a fluid conduit structure that guides fluid from the reservoir structure to the vicinity of the soil. The fluid providing structure further includes a pump structure that selectively pumps fluid through the fluid conduit structure from the reservoir structure to the vicinity of the soil. The battery is electrically connected to the pump structure. The battery provides electrical power to the pump structure to power the pumping operation of the pump structure. The battery level detector structure generates a battery level signal corresponding to the remaining capacity of the battery. The controller structure controls the selective pumping of fluid by said pump structure, receive the battery level signal from the battery level detector structure. The indicator structure indicates battery level to users under control of the controller structure based on the battery level signal.

According to at least one aspect of the present invention, there includes an apparatus for providing fluid to plants planted in soil, the apparatus having a fluid providing structure adapted to selectively provide fluid to the soil, a probe structure, having an end, a first conductor including a first conductor portion and a second conductor having a second conductor portion, the probe structure being adapted to maintain the first conductor portion and the second conductor portion in a spaced apart relationship proximate to the end so that soil surrounds the first conductor portion and the second conductor portion when the end of the probe structure is placed in the soil, a resistance measuring structure adapted to effectively determine the electrical resistance between the first conductor portion and the second conductor portion, an input structure adapted to allow a user to choose a calibration point in time; and a controller structure adapted to control the selective provision of fluid by the fluid providing structure, at the calibration point, control the resistance measuring structure to effectively determine a calibration resistance to be received by and stored in the controller structure, subsequent to the calibration point, control the resistance measuring structure to effectively determine a subsequent resistance to be received by the controller structure, and compare the subsequent resistance to the calibration resistance to determine information about the soil moisture level.

The probe structure further includes a rigid frame, with the first conductor and the second conductor are affixed to the frame portion to maintain the spaced apart relationship between the first conductor portion and the second conductor portion, a flexible cable mechanically connected to the frame and electrically connected to at least the first conductor structure, and a probe connector mechanically connected to the cable and electrically connected to at least the first conductor, with the connector portion being adapted to be detachably electrically connectable to mating connectors.

In some embodiments the end of the probe structure is substantially cylindrical in shape having a peripheral exterior surface and defining a central axis, the first connector portion is substantially shaped as a band around the peripheral exterior surface of the end, and the second connector portion is shaped as a band around the peripheral exterior surface of the end spaced apart from the first connector portion along the direction of the central axis.

In some embodiment the fluid providing structure includes a reservoir structure adapted to hold fluid away from the soil, a fluid conduit structure adapted to guide fluid from the reservoir structure to the vicinity of the soil, and a pump structure adapted to selectively pump fluid through the fluid conduit structure under control of the controller structure.

In some embodiments the reservoir structure is shaped to extend at least partially around a peripheral wall of a flowerpot.

In some embodiments the apparatus further includes a substantially fluid tight pump chamber located beneath the reservoir structure and defining an interior space and a battery electrically connected to the pump structure and adapted to provide electrical power to the pump structure to power the pumping operation of the pump structure, wherein the pump structure and the battery being located within the interior space of the pump chamber.

In some embodiments the apparatus includes an umbrella adapted and located to substantially prevent precipitation from falling on the plants in the soil of the apparatus, wherein the user input structure is a user actuatable switch electrically connected to the controller structure.

In some embodiments the resistance measuring structure includes a voltage source structure electrically connected to at least the first conductor and adapted to cause a voltage difference between first conductor and the second conductor.

In some embodiments the resistance measuring structure further includes a resistor electrically connected in series between the voltage source structure and the first conductor, and a voltage detector structure adapted to determine a voltage level of the first conductor in order to effectively determine the resistance between the first conductor portion and the second conductor portion.

In some embodiments the second conductor is electrically connected to an electrical ground and the first conductor will have a voltage level close to ground level when the soil is moist; and the first conductor will have a voltage level close to the level of the voltage supply structure when the soil is dry.

In some embodiments the voltage supply structure includes a battery and voltage regulation circuitry electrically connected to the battery and the first connector structure.

In some embodiments the controller structure is further adapted to control the fluid providing structure to provide fluid to the soil when the comparison operation determines that the subsequent resistance is greater than the calibration resistance by at least a predetermined threshold amount. In some embodiments predetermined threshold amount is zero.

In some embodiments the controller structure further includes a timer structure adapted to measure intervals of time and the point in time at which the subsequent resistance is controlled to be effectively determined by the resistance measuring structure at a predetermine interval of time measured by the timer structure.

In some embodiments the controller structure includes at least a portion of a microcontroller.

In some embodiments there includes an indicator structure adapted to indicate the information about the soil moisture level to users.

In some embodiments the indicator structure comprises a first light and a second light wherein the controller structure is adapted to control the first light to be on when the comparison operation determines that the subsequent resistance is greater than the calibration resistance by at least a predetermined first threshold amount, and the controller structure is adapted to control the second light to be on when the comparison operation determines that the subsequent resistance is less than the calibration resistance by at least a predetermined second threshold amount.

In some embodiments the predetermined first threshold amount is zero; and the predetermined second threshold amount is zero.

According to a further aspect of the present invention a PWS for providing fluid to plants planted in soil includes a planter, a fluid providing structure and an umbrella. The planter holds the soil. The fluid providing structure selectively provides fluid to the soil. The umbrella substantially prevents precipitation from falling on the plants in the soil of the PWS.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

The present invention will be more fully understood and appreciated by reading the following Detailed Description in conjunction with the accompanying drawings, in which:

FIGS. 1A and 1B are a side views of two variations of a first embodiment PWS suitable for use in the present invention.

FIG. 6 is a schematic of a portion of the circuitry of the third embodiment PWS.

FIG. 7 is a sectional view of a spreader suitable for use in the present invention.

FIG. 25 is a side view of a fifth embodiment PWS according to the present invention.

DETAILED DESCRIPTION OF THE PREFERRED EMBODIMENTS

Figure 2:
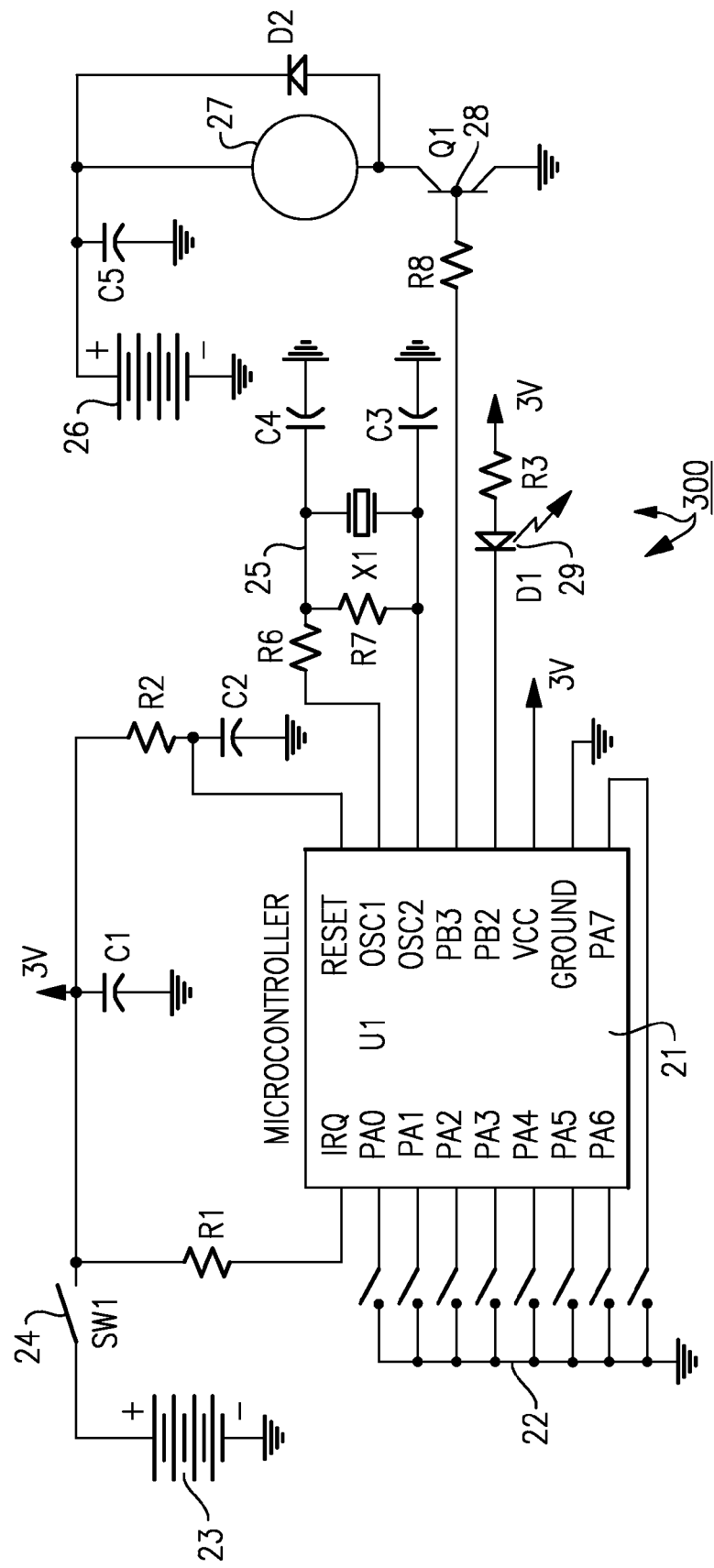
FIG. 2 is a schematic of control circuitry suitable for use in the first embodiment PWS.

The present disclosure will now be described more fully with reference to the Figures in which an embodiment of the present disclosure is shown. The subject matter of this disclosure may, however, be embodied in many different forms and should not be construed as being limited to the embodiments set forth herein.

1. First PWS Embodiment

A first embodiment of a PWS will now be discussed with reference to FIGS. 1 and 2. Although this first embodiment may not include all inventive features of the present invention, it may help show how to make and/or use preferred mode embodiments of the present invention that do include the inventive features.

FIGS. 1A and 1B are side views of first embodiment 100 and second embodiments 200 of a planter assembly suitable for use in at least some embodiments of the present invention. FIG. 2 is a schematic of control circuitry 300 suitable for use in at least some embodiments of the present invention. FIG. 3 is a side view of a third embodiment of a planter 400 suitable for use in at least some embodiments of the present invention. Embodiments 100, 200, 400 and circuitry 300 will now be discussed primarily for the purpose of explaining some of the preferred ways that the present invention can be made, used and/or practiced.

As shown in FIG. 1, a reservoir tank 1 includes a hollow vessel operatively constructed to hold water and to allow for filling and re-filling by removing filler plug 2. The tank can be of any size or shape but preferably constructed to allow the inclusion of a plant holder cavity 3, the size of which corresponds to that of a standard size flowerpot. In this embodiment, the example cited is that of a 10-inch circular tapered pot 12. The size of reservoir 1 is therefore determined by the size of the flowerpot and also the amount of water 4 it is designed to hold. The tank is fitted with attachment points 6 for hangers 11 in the event the user wishes to hang the plant instead of setting it on a surface. Output tube 13 is located near the bottom of reservoir 1 and is operatively connected to pump 10. By locating the input of pump 10 near the lower level of the water supply, pump priming issues are negated or minimized.

A low voltage direct current motor 9 drives pump 10. Flexible output tube 5 is positioned over the plant once pot 12 is placed in the holder. Controller 8 receives its power from battery 7 and, under program control, counts a predetermined interval in hours, minutes and seconds. Upon completion of that interval, pump 10 is turned on for a predetermined duration. The rate of water delivery by pump 10 is determined by design and testing and once determined the amount of time the pump is on, that is, the duration can be determined and programmed into the controller. The present program is set to deliver one-half cup (4 fluid ounces) of water to the plant at twelve-hour intervals.

Figure 3:
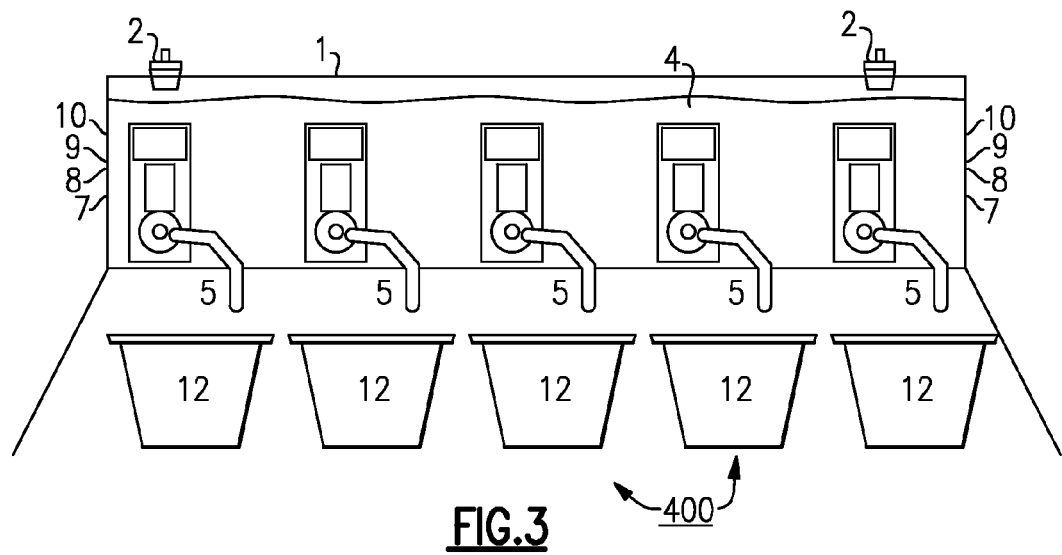
FIG. 3 is a side view of a second embodiment PWS suitable for use in the present invention.

Referring to FIG. 2, microcontroller 21 can be commercially available low power unit, such as Motorola 68HC705KJ1. Battery 23 supplies 3 VDC to operate the process. On/off switch 24 is included to turn the unit off when operation is not desired. R1, C1, R2 and C2 are common components necessary for proper startup and operation of the processor. Crystal 25 sets the processors operating frequency at 32.768 kilohertz, a convenient frequency from which to develop a time base measured in seconds. R6, R7, C3 and C4 are components of the oscillator circuit necessary to sustain oscillation at the correct frequency. Also the use of this frequency allows the processor to operate at very low current level. This, along with power saving programming techniques allows for a sufficiently long battery life in the order of a year or more of continuous use. The processor pin labeled PB2 flashes the attached LED 9 once every 5 seconds as an indication to the user that the system is working. The processor pin labeled PB3 is attached through resistor R8 to transistor QI 28. When this pin goes HIGH, the transistor is turned on allowing current to flow from Battery 26 through motor 27 to ground, causing the motor to spin. Causing the pin to go LOW shuts the motor off. C5 and D2 are included to mitigate electrical motor noise. The length of time PB3 is held high by the program is the "pump duration time." Battery 26 is separate from battery 23 since the motor requires a much higher current level than the processor to operate. Battery 26 is considered here to be a single standard "D" cell that will operate the pump motor for about a year. Batteries 23 and 26 can be replaced by design with larger or smaller capacity units as needed for various applications. An assembly language program can be used by the processor.

A 32.768 KHz clock is a convenient frequency to use when trying to establish a time base. As 1/32.768 kHz equals 244.14 microseconds and the processor's timer overflows every 1024 clock cycles, each timer overflow is equal to 0.25 seconds. In the sample processor, the timer overflow can be made to generate an interrupt, allowing the process to enter a low power "wait" mode until interrupted by the timer. The reason for this is to assist in reducing battery current draw. The object of the program is to initially set up it's internal registers and then to begin counting timer overflows (240 overflow interrupts equal 1 minute). As each interrupt occurs, a "blink" register is incremented and compared to 5. When equal the processor causes the LED to flash for approximately 1 millisecond, giving a visual indication that the device is functioning. The "blink" register is then cleared. Also as each interrupt occurs, a "seconds" register is incremented and compared to 240. When equal, it is cleared and the "minutes" register is incremented and compared to 60 (1 hour). When equal, the "minutes" register is cleared and the "hours" register is incremented and compared to 12. When equal, the program jumps to the "pump" routine and starts the pump motor running.

As the "pump" routine starts, the "seconds" register is cleared and allowed to increment at each timer interrupt until the "duration" is reached. In the sample program reproduced above, the pump is allowed to run for 30 seconds. When the pump is turned off, the program is sent to the beginning of the program in order to begin another 12-hour cycle. Again it should be noted here that the processor has 8 inputs which can be set to either 1 or 0 by means of a switch on each line or by physically opening or shorting the line with a wire or circuit trace. As the "interval" and "duration" numbers are variables in the program, the program can be written to read the input port (PB0-PB7) and alter the interval and duration variables according to the value it reads from the port. Thus, up to 255 variations can be accommodated in the program.

2. Second PWS Embodiment

A second embodiment of a PWS will now be discussed with reference to FIG. 3. Although this second embodiment may not include all inventive features of the present invention, it may help show how to make and/or use preferred mode embodiments of the present invention that do include the inventive features disclosed herein.

Referring to FIG. 3, more than one pump 10 can be connected to a common reservoir 1 and be controlled by a common processor 8 or by separate processors 8 in order to service several plants simultaneously. Outdoor versions could also be implemented using the same techniques. Solar panels could be included to augment the batteries. Moisture sensors can be easily implemented to measure the water content in the soil and prevent "on schedule" watering when not necessary as in the case of a rainy day. As an outdoor version is quite likely to encounter rain, provisions can be made in the physical design of the reservoir to collect rainwater to augment the water level in the tank.

Another useful adaption on this theme is to provide a common reservoir 1 and pump 8 strictly for the purpose of delivering liquid fertilizer to the plant. Given the long lengths of time that the processor can measure, this secondary system could easily fertilize the plant on a weekly, monthly or longer schedule. Additionally, the DC pump motor 10 can be replaced with an AC submersible pump in applications where a source of AC power is available. Changes to the motor switching circuit may become necessary and the switching transistor circuit (FIG. 2) could be replaced with means suitable for switching alternating current. For example the transistor circuit could be replaced with a Silicon Controlled Switch (SCS) or an optically coupled relay, etc. all of which are able to be driven by the existing microcontroller.

3. Third PWS Embodiment

Figure 4:
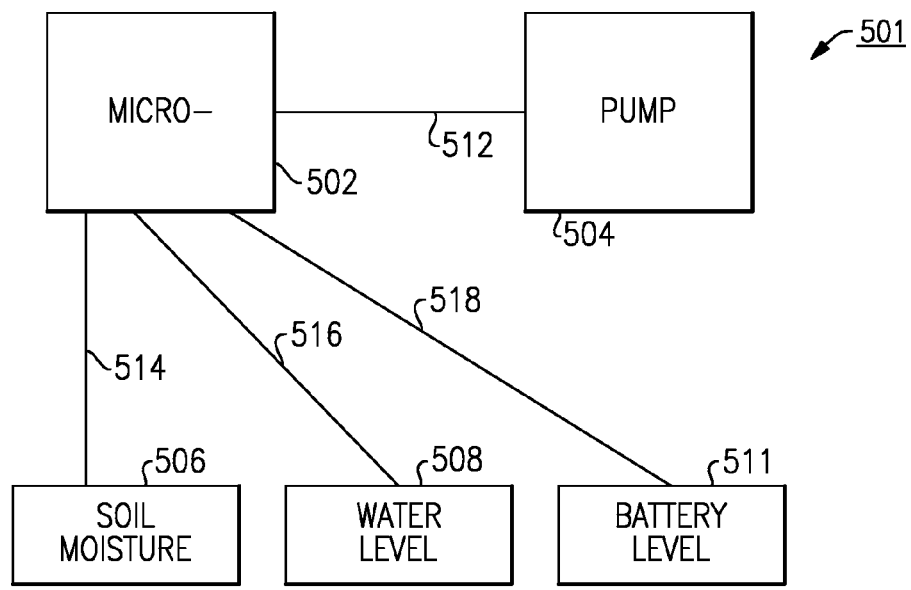
FIG. 4 is a schematic of circuitry according to a third embodiment PWS according to the present invention.
Figure 5:
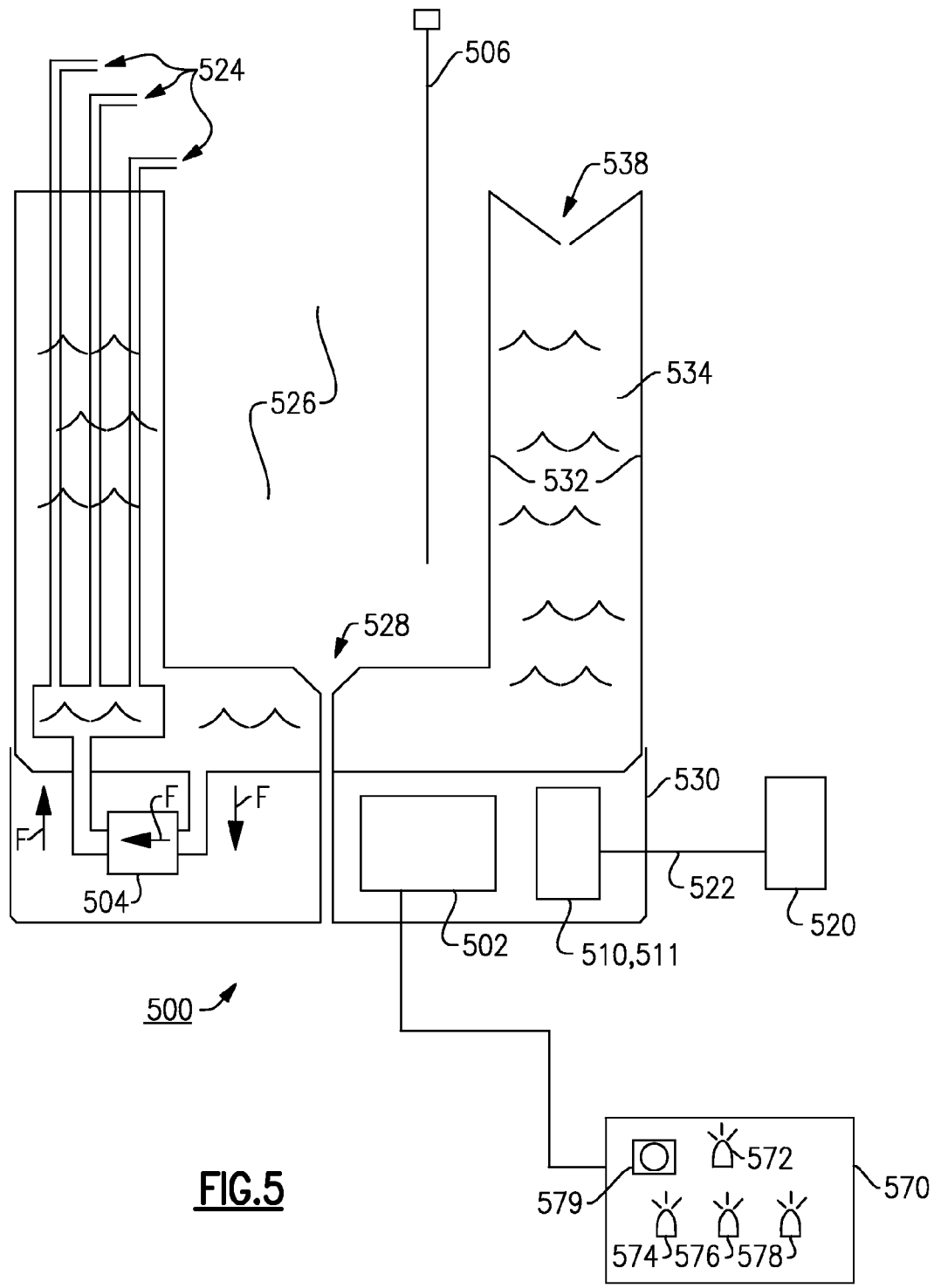
FIG. 5 is a schematic, cross-sectional view of the third embodiment PWS.

A preferred embodiment of the present invention will now be described with reference to FIGS. 4-6 and 26. FIG. 5 shows preferred PWS assembly 500 according to the present invention including microcontroller 502; electric pump 504; soil moisture probe 506; battery 510; battery level detector 511; solar panel 520; solar panel electrical connection 522; watering tubes 524; bottom cover 530; reservoir tank 532; reservoir fluid 534; and indicator panel 570.

Tank 532 defines: (i) a fluid-tight interior space for holding reservoir fluid 534; (ii) a central chamber 526; and (iii) drain 528. Reservoir fluid (or "water") is preferably $H_2O$, but additionally or alternatively may have fertilizer components, pest control components and/or other additives in it. Herein, "water", "moisture" and "watering" shall be deemed to refer, as appropriate, to any fluid provided to plants and the process of providing it, even if the fluid is not wholly, or even partially made of $H_2O$. The water is selectively driven by the pump in the direction of arrows F, through the conduits and watering tubes shown in FIG. 5, and into the central chamber. The tank may be made of metal, plastic and/or other materials. The tank may be made in as a unitary part, or as a plurality of parts fastened together. The interior space may be made up of a plurality of sub-spaces, which may or may not be in fluid communication with each other.

The chamber is shaped and located to hold one or more plant containers, so that soil in the plant containers is selectively watered by water from reservoir tank via the pump and watering tubes. The selective watering is performed under the control of the microcontroller, which sends appropriate signals to turn the pump on and off, as will be explained in more detail below. It is preferred that the chamber be shaped to extend substantially around the entire periphery of the plant container(s) designed to be placed therein, but this is not a requirement of all embodiments of the present invention. In fact, in some embodiments of the present invention, the reservoir may be over the plant containers, under the plant containers, or even away from the immediate vicinity of the plant containers. Some embodiments of the present invention may not even require plant containers at all (for example, irrigation type PWSs), although most preferred embodiments of the present invention do include planters and/or other containers for soil and plants.

The drain drains excess water from the chamber. This excess water may come from splashing of water delivered directly from the watering tubes, from seepage or flooding of the plant containers, and/or from ambient precipitation. Although the drain will be present in most preferred embodiments of the present invention, there will be a reduced need for such drainage in certain embodiments of the present invention. For example, in embodiments with an umbrella located over the chamber, to be explained in more detail below, little or no ambient precipitation will reach the chamber. Also, the control based on output of the soil moisture probe make it less likely that seepage and/or flooding from any resident plant containers will occur.

The pump may be any type of fluid pump now known or to be developed in the future. Alternatively, some embodiments of the present invention may have alternative fluid driving hardware and may not require a pump. For example, PWSs with selectively driven vacuum means, selective siphoning, selective osmosis, selective gravity drive, selective wicking, pressure drive or other means of driving the fluid (now known or to be developed in the future) may be used in some, non-preferred embodiments of the present invention.

The preferred fluid pump according to the present invention is a low voltage direct current (dc) motor inside of a fluid tight housing. A disk containing two diametrically opposed magnets is attached to the motor shaft for balance. On the outer face of the housing, an impeller with two similar opposing magnets is made to rotate on a spindle. In this way, the impeller is magnetically couple to the motor disk and spins directly as the motor. The impeller is surrounded by a cover that acts as a pump chamber. The pump chamber has an input tube to directed water from the reservoir to the pump. The pump chamber also has an output tube to direct water to the planter, which is preferably located in a central chamber such as central chamber 526 of tank 532.

The soil probe is located at least partially in the soil of a plant container placed within the chamber. The soil probe is preferably a resistance detector that measures moisture level indirectly by effectively determining electrical resistance between two conductors in the soil, preferably at root level. For example, the magnitude of electrical resistance generally goes down with the amount of $H_2O$ present, so in most embodiments of the present invention, a larger resistance will indicate drier soil. Alternatively, in some embodiments of the present invention, other types of moisture detectors, now know or to be developed in the future, may alternatively or additionally be used such as capacitive detectors, optical detectors, sonic detector, magnetic detectors, pH detectors, weight detectors, pressure detectors and so on. In some embodiments of the present invention, there may be no soil probe at all. For example, in some embodiments of the present invention, the control hardware will cause watering to occur at regular time intervals, regardless of the soil moisture level.

The battery (See Definitions Section) is preferably a standard, commodity rechargeable or non-rechargeable battery, and may or may not include a plurality of physically separate battery units. The tank and/or bottom cover preferably prevent fluids from entering the vicinity of the battery and/or other electronics, such as the microcontroller, to prevent short circuits and/or corrosion. Although the battery level detector is shown to be physically proximate to the battery in assembly 500, these components may be spaced apart in some embodiments of the present invention. In some embodiments of the present invention, the battery and/or battery level detector may not be required. For example, in some embodiments AC utility power or solar power may be used to drive the pump or other fluid driving means. As a further example, embodiments that do not require external power to drive the water, such as gravity drive embodiments, may not require a battery. Also, in assembly 500, the solar panel helps to recharge the battery which means that the battery level detector might not be that helpful.

The indicator panel is electrically connected to the microcontroller and includes the following indicator lights: low battery indicator 572; low reservoir indicator 573; "more dry" soil condition indicator 574; "medium" soil condition indicator 576; and "more wet" soil condition indicator 578; and on/off switch 579. The microcontroller controls these indicators to be on or off, a appropriate in response to signal from the soil moisture probe, the battery level detector, and water level detector 508 (shown in FIGS. 4 and 6). Alternatively, other kinds of visual indicators can be used, such as an LCD screen. The on/off switch turns the entire system on and off, and, in this embodiment, is in the form of a button suitable for indoor use. Alternatively, the on/off switch could be a toggle, a waterproof switch, a magnetic key (further explained below), or any other type of hardware or software switch now known or to be developed in the future. Although assembly 500 includes just these indicator lights and switch(es), it should be understood that more or less indicators and switch(es) could be provided in order to achieve the desired degree of input from the user and output to the user.

The electronics portion 501 of assembly 500 will now be discussed with reference to FIGS. 4 and 6. As shown in FIG. 4, electronics portion 501 primarily includes microcontroller 502; electric pump 504, soil moisture probe 506; water level detector 508; battery level detector 511; and electrical connections 512, 514, 516, 518. As shown in FIG. 6, the microcontroller includes 5 pins P1, P2, P3, P4, P5. As shown in FIG. 6, the soil moisture probe includes resistor 544; non-grounded electrode 546; and grounded electrode 548. As shown in FIG. 6, the water level detector includes resistor 552; non-grounded electrode 550; and grounded electrode 554.

Soil moisture probe is preferably constructed as two mechanically parallel conductors that change resistance with variations in the moisture in the space therebetween. Effectively, these probe electronics can be considered as one half of a voltage divider which, in turn, is preferably an input to an analog comparator. The analog comparator preferably has a variable threshold to adjust the trip point(s) for varying degrees of moisture. As a further, even more preferred alternative, and as shown in FIG. 6, the soil moisture probe is directly electrically connected (see Definitions section) to the microcontroller. Specifically, as shown in FIG. 6, the soil moisture probe is connected to pin P4 of the microcontroller receives the soil moisture probe output through electrical connection 514. Pin P4 is preferably an A/D converter input of the microcontroller.

Figure 26:
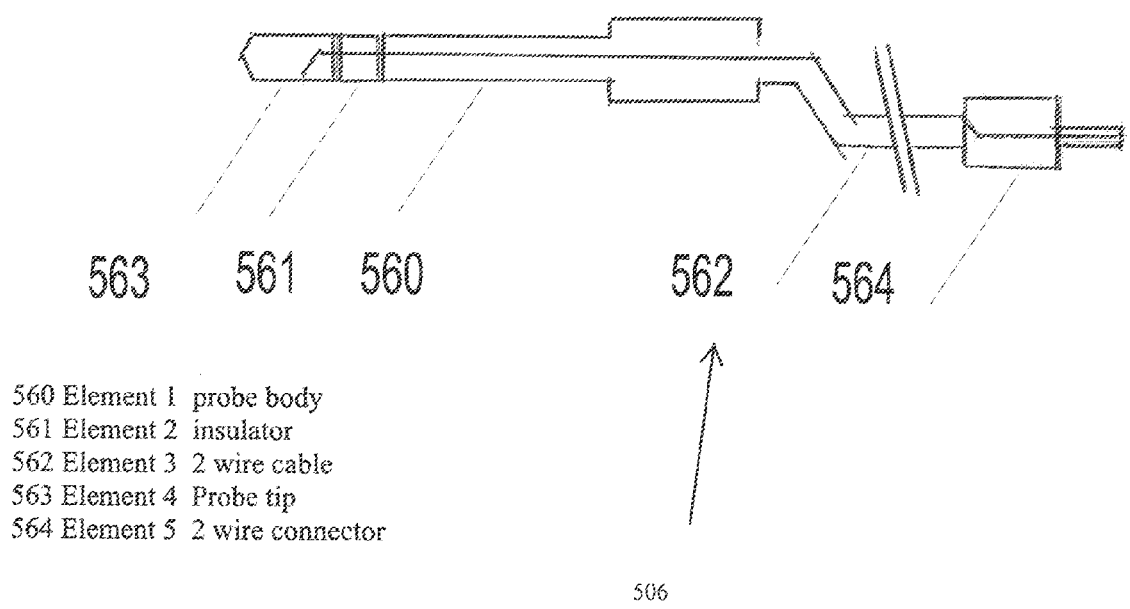
FIG. 26 is a side view of a soil moisture probe for use in the present invention.

FIG. 26 shows the visual appearance of a preferred embodiment of soil moisture probe 506, including probe body 560; direct electrical connection 562; connector 564; and probe tip 563. The probe hardware preferably includes two conductors (sometimes herein called electrodes) separated by an insulator 561. In a preferred embodiment the end of the cylindrically-shaped probe has two bands around its outer peripheral surface—one for each conductor. The geometry of the probe may be modified, as appropriate, for various factors such as planter depth, root level, soil type, and expected soil moisture levels. Also, the preferred soil moisture probe and associated electronics (for example, the portion of the microcontroller that receives and responds to input from the soil moisture probe) assumes that the fluid in the soil will be $H_2O$ or behave like $H_2O$. However, as explained above, plant "watering" systems of the present invention may "water" plants with fluids other than $H_2O$. To the extent that the watering fluids have different electrical properties than pure $H_2O$, appropriate adjustments to the probe geometry and soil moisture probe related electronic hardware and/or software may be necessary.

An exemplary control method using the output of the soil moisture probe will now be disclosed: (i) microcontroller check the output of the soil moisture probe at predetermined time intervals (for example, one hour); (ii-a) if the soil moisture output probe indicates a dry condition (for example a low signal), then the pump is turned on for a predetermined interval; (ii-b) if the soil moisture output probe indicates a wet condition (for example a high signal), then the pump is not turned on; and (iii) processing returns to step (i). In many preferred algorithms according to the present invention, and as further discussed below, the control may be more complex and include additional inputs and possible operation outcomes. However, this simple exemplary process can help show the role that a soil moisture probe can play in various control algorithms according to the present invention.

One preferred embodiment for the water level detector is a float type fluid level detector, such as a magnetic float and associated magnetic sensor. As shown in FIG. 6, another embodiment for the water level detector is to use a resistance detector similar in operation to the soil moisture probe discussed above, but with two proximate conductor surfaces placed within the reservoir rather than in the soil of the planter. When fluid level in the reservoir drops below the electrodes of the probe type water level detector, then resistance therebetween will rise, and cause the output of the resistance detector to indicate a high resistance. As shown in FIG. 6, pin P5 of the microcontroller receives the water level detector output through electrical connection 516. Pin P4 is preferably an A/D converter input of the microcontroller.

When the water level detector detects a low fluid level in the reservoir, the microcontroller may be structured and/or programmed to cause one or more of the following operational outcomes: (i) visual indication to users of low fluid level condition; (ii) audio indication to users of low fluid level condition; and/or (iii) prevent pump from operating. In embodiments where operation of the pump without fluid can damage the pump, it is preferred to suspend operation of the pump if fluid is sufficiently low. Also, there may be multiple water level detectors. For example, a first detector may be placed at a location somewhat above a second water level detector so that the first detector causes an indication of low fluid to users (when there is still some fluid in the reservoir), and the second detector suspends operation of the pump when the fluid is so low that the pump will not have fluid.

As shown in FIG. 6, pin P1 of the microcontroller receives the battery level detector output through electrical connection 518. The battery level detector may be of any type now known or to be developed in the future.

As shown in FIGS. 4 and 6, pin P3 of the microcontroller outputs a control signal over electrical connection 512 to turn the pump on and off based its algorithm and, preferably, also on inputs from the soil moisture probe, the water level probe and/or the battery level probe. For one example, the microcontroller's hardware and/or programming may cause the pump to generally be turned on when the soil moisture probe indicates dry soil and generally to be turned off when the soil moisture probe indicates dry soil. As a further example, the pump may be turned on and off primarily based on timing control, but may turn the pump on, regardless of the time, if the soil becomes dry beyond a dryness threshold and/or turn the pump off, again regardless of time, if the soil is moist beyond a wetness threshold. As a further example, the microcontroller's hardware and/or programming may cause the pump to remain off if the water level probe indicates that the reservoir has dropped too low. This may be a preferred kind of control in embodiments where the pump can be damaged if it is run without sufficient fluid. As a further example, the microcontroller's hardware and/or programming may cause to remain off if the water level probe indicates that the battery's energy level has dropped too low. This may be a preferred kind of control in embodiments where a rechargeable battery can be damaged if it is overdischarged.

Besides providing simple on/off control for the pump, the microcontroller may also control pump speed, or a pump duty cycle when the pump is in on mode. For example, it may be preferred to run the pump only at a low flow rate when the battery is low of the reservoir level is low. This additional kind of control, preferably depending on inputs from the soil moisture probe, water level detector and/or battery level detector, can be achieved in embodiments of the present invention where the pump speed or duty cycle is variable.

4. Watering Tube Spreader Embodiment

FIG. 7 shows a watering tube spreader 580 suitable for use with assembly 500 discussed above. The spreader includes mounting spike 582; dispersing tubes 583; and spacer 586. Plant watering tube 524 from assembly 500 is inserted into the spacer in a substantially fluid tight manner. The mounting spike is inserted into the soil of the planter to thereby secure the spreader. There are preferably four dispersing tubes disposed 90 degrees apart in an angularly evenly spaced manner about the body of the spreader. Water from the watering tube, selectively delivered by assembly 500 is thereby split into four delivery streams and can water four separate sections of the planter. Although FIG. 5 shows three watering tubes 524, the use of spreaders may decrease the need for separate watering tubes.

5. Some Possible Variations on PWS Embodiment(s)

A couple of possible variations on the third embodiment assembly will now be discussed. One variation is that the pump may located in the interior space reservoir tank with the reservoir fluid. Herein, this is referred to as a submerged or submersible pump design. If the pump is submerged, then it will preferably include a substantially fluid tight housing. In submerged pump embodiments, wiring from the controller and/or power supply to the submerged pump is also preferably protected by a substantially fluid tight insulator, at least within the space of the reservoir tank. A PVC tube can be run from the fluid outlet of the pump to direct fluid to the plants in the manner of watering tubes 524 (discussed above).

Figure 8:
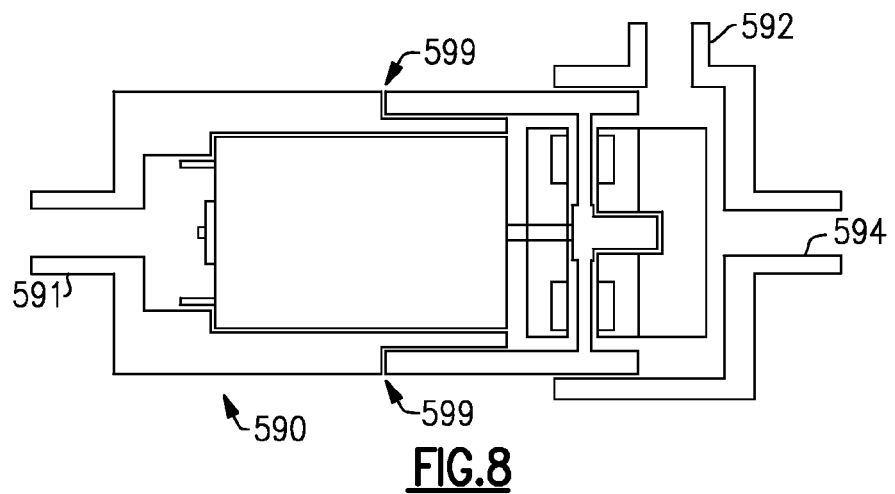
FIG. 8 is a sectional view of a submersible pump for use in the present invention.
Figure 9:
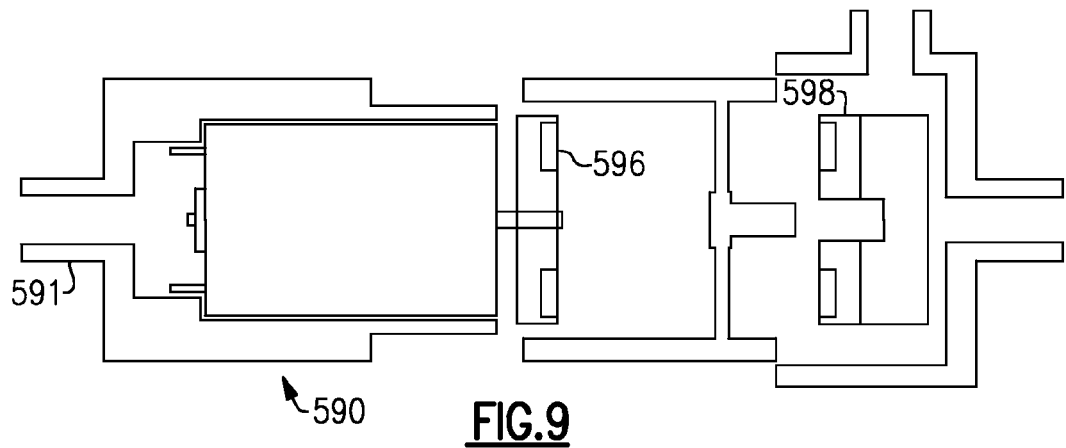
FIG. 9 is a sectional view of a submersible pump for use in the present invention.
Figure 10:
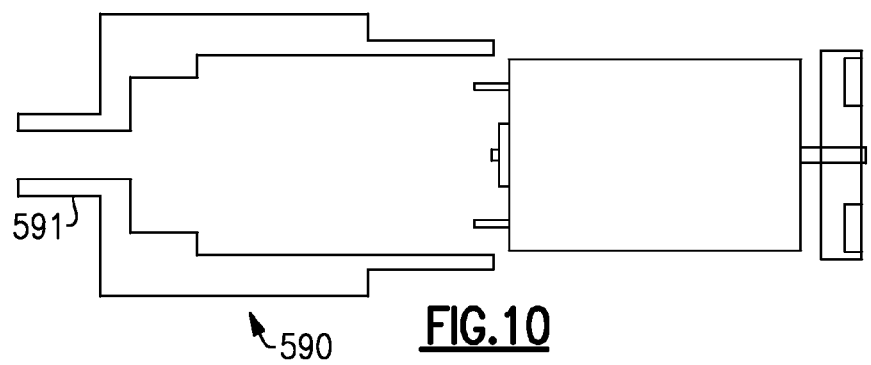
FIG. 10 is a sectional view of a submersible pump for use in the present invention.

As an example of a suitable construction for a submerged pump, FIGS. 8 to 10 show submersible pump 590, including: wiring receptacle 591; water outlet 592; water inlet 594; impeller driver 596; impeller 598; and fluid tight seal 599. Any electrical wires required to operate the pump are preferably encased in a PVC tube, which is inserted into the wiring receptacle (formed as a PVC tubing attachment), to ensure that the pump does not leak where the wires enter the pump.

6. Magnetic Key Switch Embodiment

Figure 12:
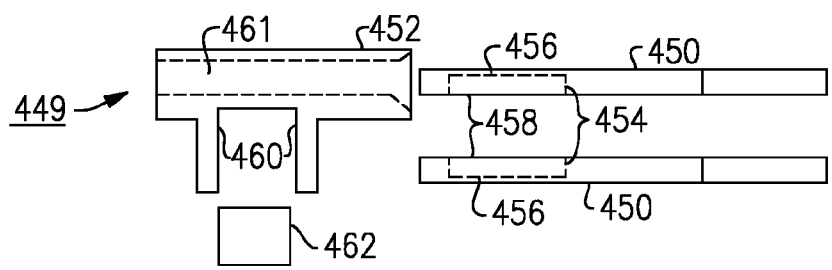
FIG. 12 is a side view of the switch assembly.
Figure 13:
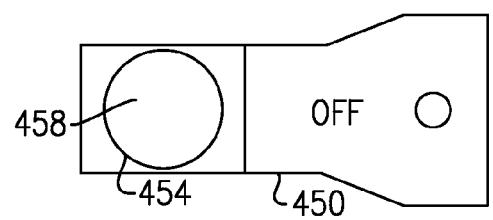
FIG. 13 is a bottom view of a key for use in the switch assembly.
Figure 14:
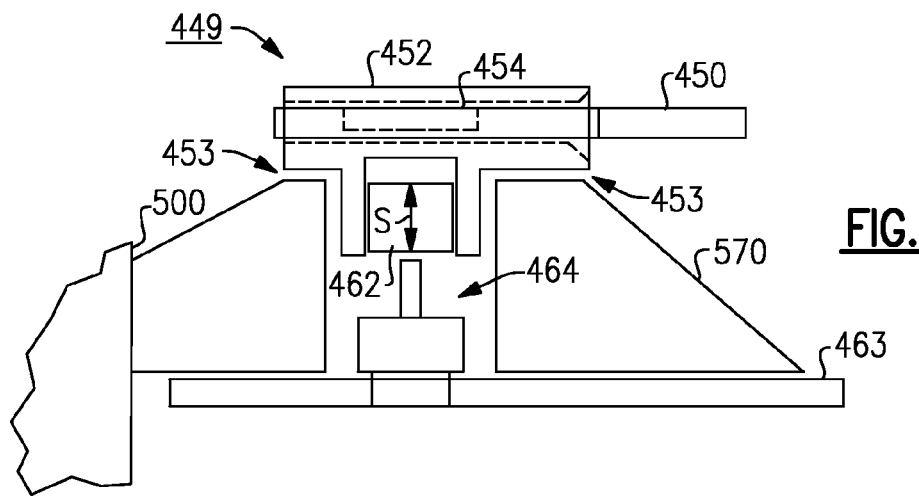
FIG. 14 is a cross-sectional view of the switch assembly.
Figure 15:
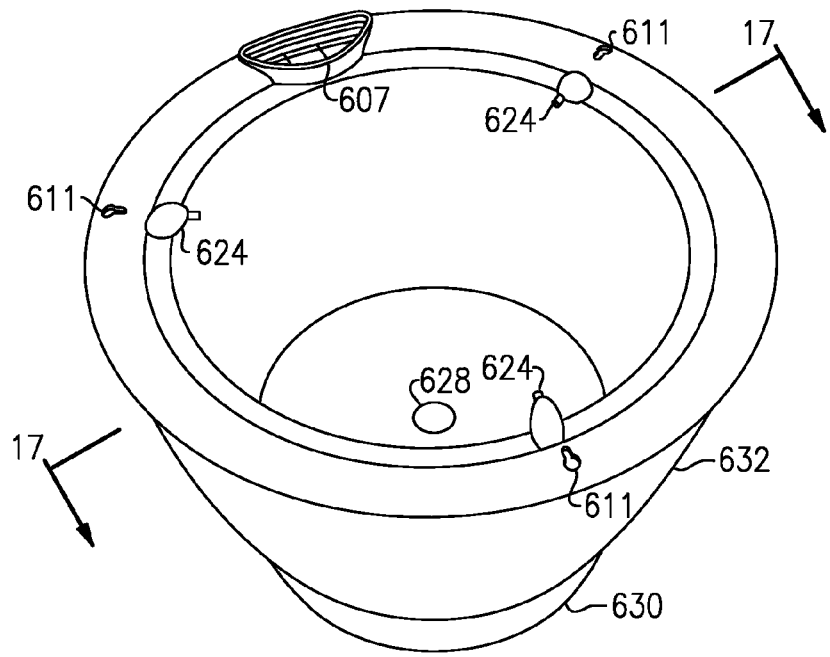
FIG. 15 is a perspective view of a fourth embodiment PWS according to the present invention.
Figure 16:
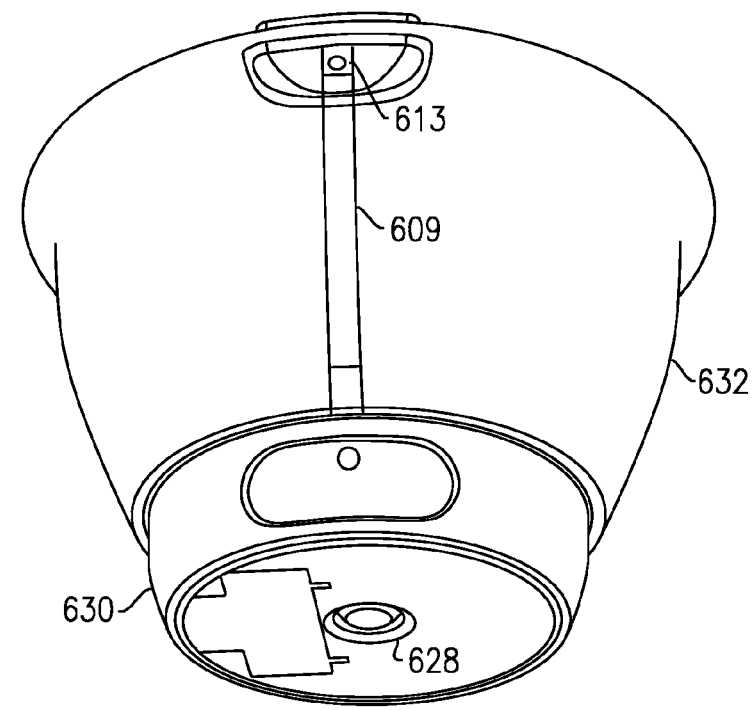
FIG. 16 is a perspective view of the fourth embodiment PWS.
Figure 17:
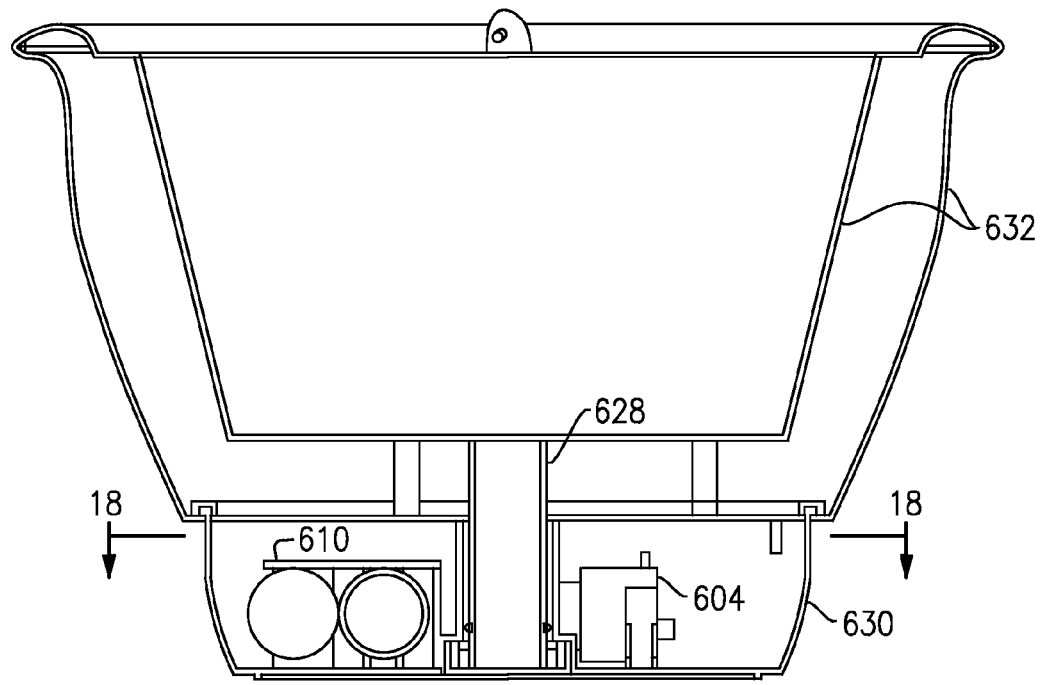
FIG. 17 is a cross-sectional view of the fourth embodiment PWS.
Figure 18:
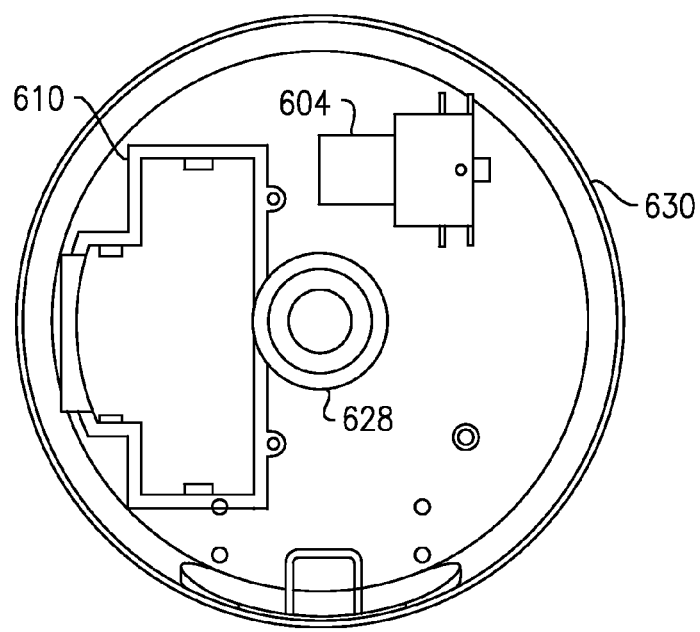
FIG. 18 is a cross-sectional view of the fourth embodiment PWS.

FIGS. 11 to 14 show an embodiment of a magnetic key switch 449 according to the present invention. As shown in FIG. 14, the magnetic key switch can be used in conjunction with PWS assembly 500 and its control panel 570, in order to turn PWS assembly 500 on and off. The magnetic key switch includes key 450; switch housing 452; key magnet 454; switch actuator magnet 462; PCB 463; and push button switch 464. The switch housing defines magnet channel 460 and key slot 461. Key magnet 454 includes north pole surface 456 and south pole surface 458. PCB 463 may contain additional electronics, such as microcontroller 502. Although magnetic key switch 449 is explained with reference to its use as an on/off switch in a PWS, it should be understood that its application(s) may extend well beyond that, and that it may be used any time a user actuatable switch is required, especially if the switch must be substantially fluid tight, such as in applications where the switch helps control an electrical appliance to be used outdoors or near water.

Figure 11:
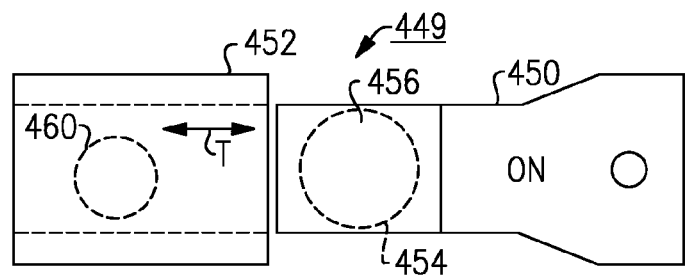
FIG. 11 is a top view of a switch assembly according to the present invention.

As shown in FIG. 12, when the key is outside of the key slot, a user can turn it 180 degrees about its central axis between: (i) a first orientation where the south pole surface of the key magnet faces toward the switch actuator magnet; and (ii) a second orientation where the north pole surface of the key magnet faces toward the switch actuator magnet. FIG. 11 shows the key, as it would be seen from the downward looking perspective of a user, when it is in orientation (i). FIG. 13 shows the key, as it would be seen from the downward looking perspective of a user, when it is in orientation (ii). As indicated by the key printing on FIGS. 11 and 13, the user places the key in orientation (i) when the switch is to be turned on, and manipulates the key into orientation (ii) when the switch is to be turned off.

After the user manipulates the key into the desired orientation (i) or (ii), the user slides the key into the switch housing in the direction of arrow T. Depending upon the orientation, interplay between the magnetic fields of the key magnet and the switch actuator magnet will cause the switch actuator magnet to move in the direction of arrow S within the magnet channel of the switch housing. More particularly, when the key is in orientation (i), with the key magnet south pole facing the switch actuation magnet, the switch actuation magnet will be repelled by the key magnet and will press down on the push button, thereby turning on the push button switch. When the key is in orientation (ii), with the key magnet north pole facing the switch actuation magnet, the switch actuation magnet will be attracted to the key magnet and will rise away from the push button, thereby turning off the push button switch.

Preferably seal 453 between the switch housing and the control panel is fluid tight. Magnetic key switch is considered to be a cost effective design, especially for fluid tight switches. The moving parts are isolated from the fluid tight seal. PCB mounted push button switches are inexpensive and can be more durable than toggle switch alternatives. The geometry of the magnetic key switch can be made by injection molding, which is inexpensive. Preferably neodymium (rare earth) magnets are used for the key magnet and switch actuation magnet because this material is strongly magnetic and cost effective. Preferably, the key is tethered to the switch housing, control panel or assembly 500 by a strap (not shown).

7. Fourth PWS Embodiment

A highly preferred embodiment of the present invention will now be described with reference to FIGS. 15 to 24 and 26 to 28.

Figs. 15 to 18 and 26 to 28 show the mechanical layout of highly preferred PWS assembly 600 according to the present invention, including: soil moisture probe 506; electric pump 604; reservoir fluid inlet 607; reservoir feed tube 609; battery 610; soil moisture probe jack 613; watering tubes 624; bottom cover 630; reservoir tank 632; control panel 670; dimples 672; translucent areas 674; soft power switch 738; set switch 740; calibration switch 742; indicator LEDs 746; printed circuit board ("PCB") 764; screws 766; and support tray 768. The tank defines hanger apertures 611. The tank and bottom cover together define drain 628. The support tray defines support tray apertures 769. Connector 564 of soil moisture probe is plugged into and thereby electrically connected to the soil moisture probe jack when assembly 600 is in use.

For the sake of clarity of illustration, some elements present in the assembly, but not shown in the drawings are: battery level detector hardware; and water level detector hardware. The battery level detector hardware is preferably built into the circuitry on PCB 764. The water level detector hardware may be similar in appearance to that of the soil moisture probe, but would be located within and affixed to the interior space of reservoir tank 632. Also for the sake of clarity of illustration, the control panel support tray and PCB are not shown in FIGS. 15 to 18, but only in FIGS. 27 and 28.

Figure 27:
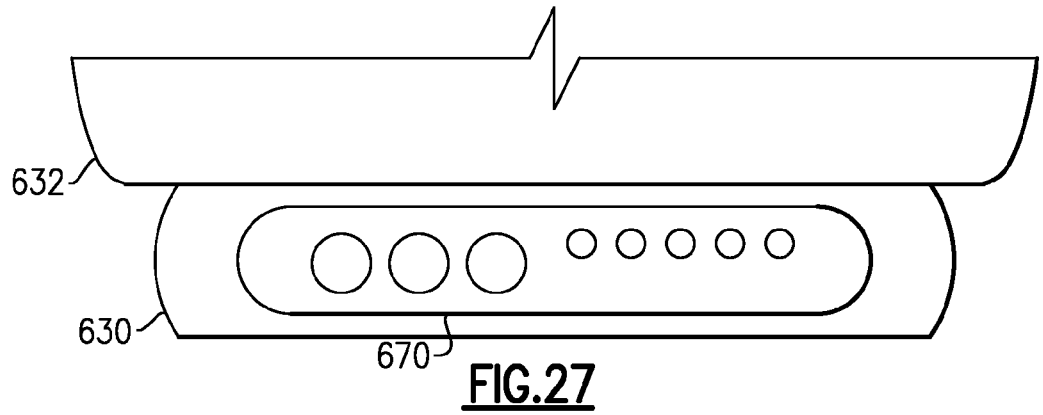
FIG. 27 is a partial side view of the fourth embodiment PWS.
Figure 28:
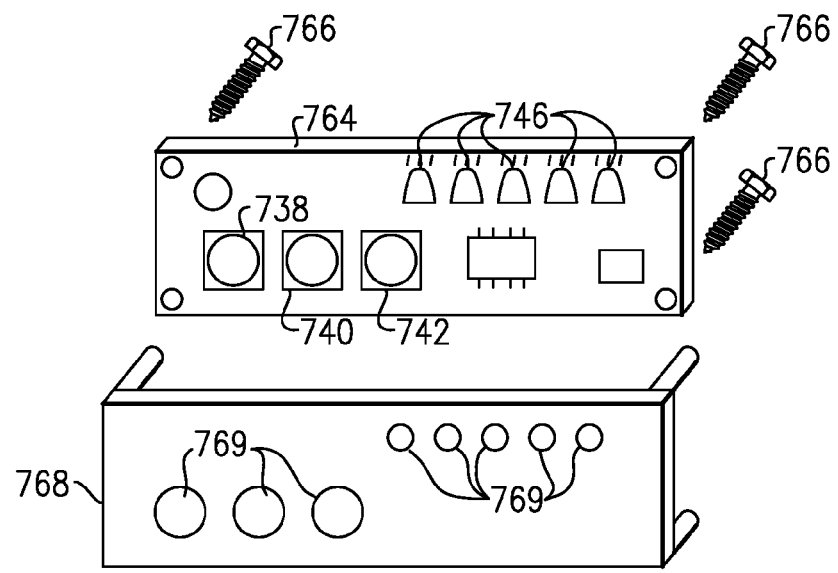
FIG. 28 is an exploded view of a portion of the fourth embodiment PWS.
Figure 28:
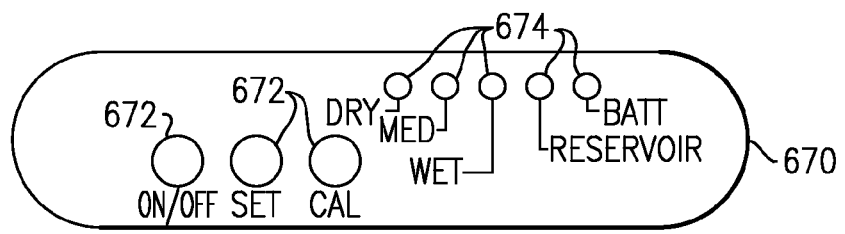

FIG. 27 shows a control panel 670 which is located within a peripheral exterior wall of bottom cover 630. The control panel is preferably a fluid tight piece of vinyl, or other resilient, flexible material so that precipitation and/or splashed water does not get into the interior space of the bottom cover where the electronics reside. As shown in FIG. 28, the control panel may be printed with text and/or graphics so that users will better understand the functionality of the switches and LEDs.

As shown in FIG. 28, the PCB is screwed into the support tray by the screws so that the support tray apertures align with the soft power switch, the set switch, the calibration switch, and the indicator LEDs secured to the PCB. This alignment allows users actuation access to the switches and visual access to the indicator LEDs. As shown in FIG. 28, the control panel is secured over the support tray so that the dimples align with the switches and the translucent areas align with the indicator LEDs. Again, this alignment allows users of assembly 600 appropriate actuation and visual access to the switches and LEDs beneath the fluid tight control panel layer. Alternatively, the control panel, support tray and/or PCB may be attached to the reservoir tank, to a planter hanging device, or even be remotely located the rest of the assembly (through a wired and/or wireless signal transmission connection).

Figure 29:
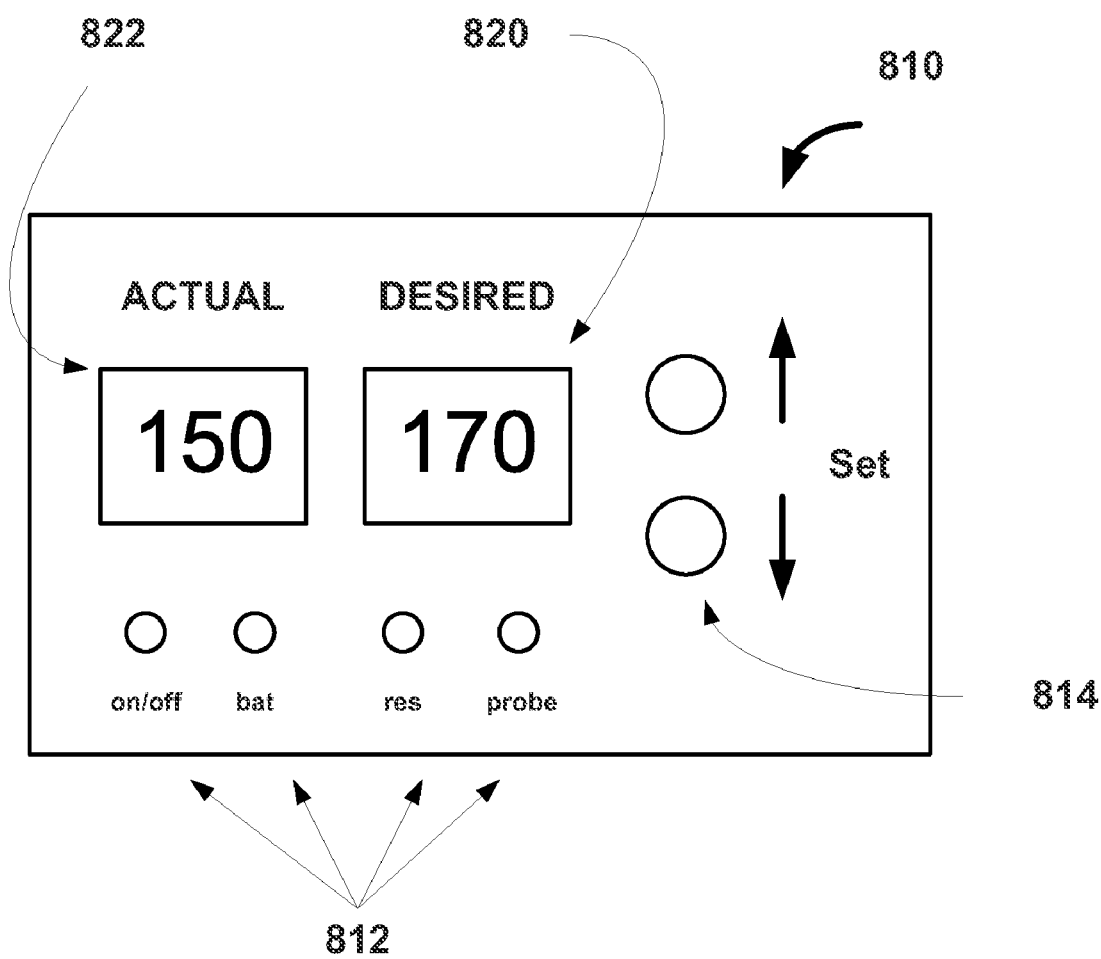
FIG. 29 is view of an alternative control panel according to another embodiment of the present invention.

As shown in FIG. 29, there is shown an alternative embodiment of the display. Display 810 includes two 3-digit displays 820 and 822. Display 820 is the actual soil moisture as read by the probe and computer. Display 820 is a display of the present moisture condition of the soil which is updated every 1.5 seconds as the soil moisture is read by the probe and converted by the PCB. Display 820 is the desired soil moisture. The user can set this number anywhere between min and max (preferably between 0-255). The desired moisture number will remain fixed until the user decides to change it.

There are two SET buttons 814, one to raise the number and one to lower it. In this way buttons 814 are used to change the desired soil moisture number. The program assumes the "SET Point" is the number displayed on the desired soil moisture display 820. During program execution the processor compares the desired moisture number to the actual moisture number and activates a pump cycle only when the actual soil moisture is below the desired soil moisture. In this regard this embodiment advantageously provides the user with constant visual feedback of the condition of the system. The circuitry residing on the PCB will be further discussed below in connection with FIGS. 19 to 24.

In addition, the present invention includes a method for adjusting the SETPOINT or moisture level. After determining a reading from the soil prober, the devices displays the A/D reading on a first visual display, or the ACTUAL moisture level, ranging from 0-255 for an 8 bit A/D. Thereafter the device determines the DESIRED trip point which is controlled by the processor and includes an up and down set of buttons.

After determining the relative positions of the ACTUAL and DESIRED moisture levels the system turns on the pump to increase the moisture level in the plant soil. in the plant soil. In some embodiments the readings are visual and in some embodiments the readings are audible or both. Preferably the visual display are in a constant "ON" position so that the user may determine the ACTUAL and DESIRED at any point in the process.

Although the support tray is only shown as extending over the PCB, in some preferred embodiments the support tray is extended beyond the footprint of the PCB so that it can also be used to secure the battery and/or pump.

FIGS. 19 to 24 show the circuitry for the fourth embodiment PWS, including: microcontroller 602; first circuitry portion 702; second circuitry portion 704; third circuitry portion 706; fourth circuitry portion 708; fifth circuitry portion 710; sixth circuitry portion 712; input/output (i/o) interface 720; detectors interface 722; positive voltage supply reference point ("ref pt") 726; reset ref pt 728; PTA4 ref pt 730; soil probe ref pt 732; reservoir low ref pt 734; power in ref pt 736; soft power switch 738; set switch 740; calibration switch 742; indicator LEDs 746; calibration ref pt 748; set ref pt 750; regulator 754; socket strip 756; and various signal lines, grounds, pin out schemes, capacitors, resistors and other components as shown and labeled in FIGS. 19 to 24. Of course, ref pts common between the figures are directly electrically connected to each other.

Figure 19:
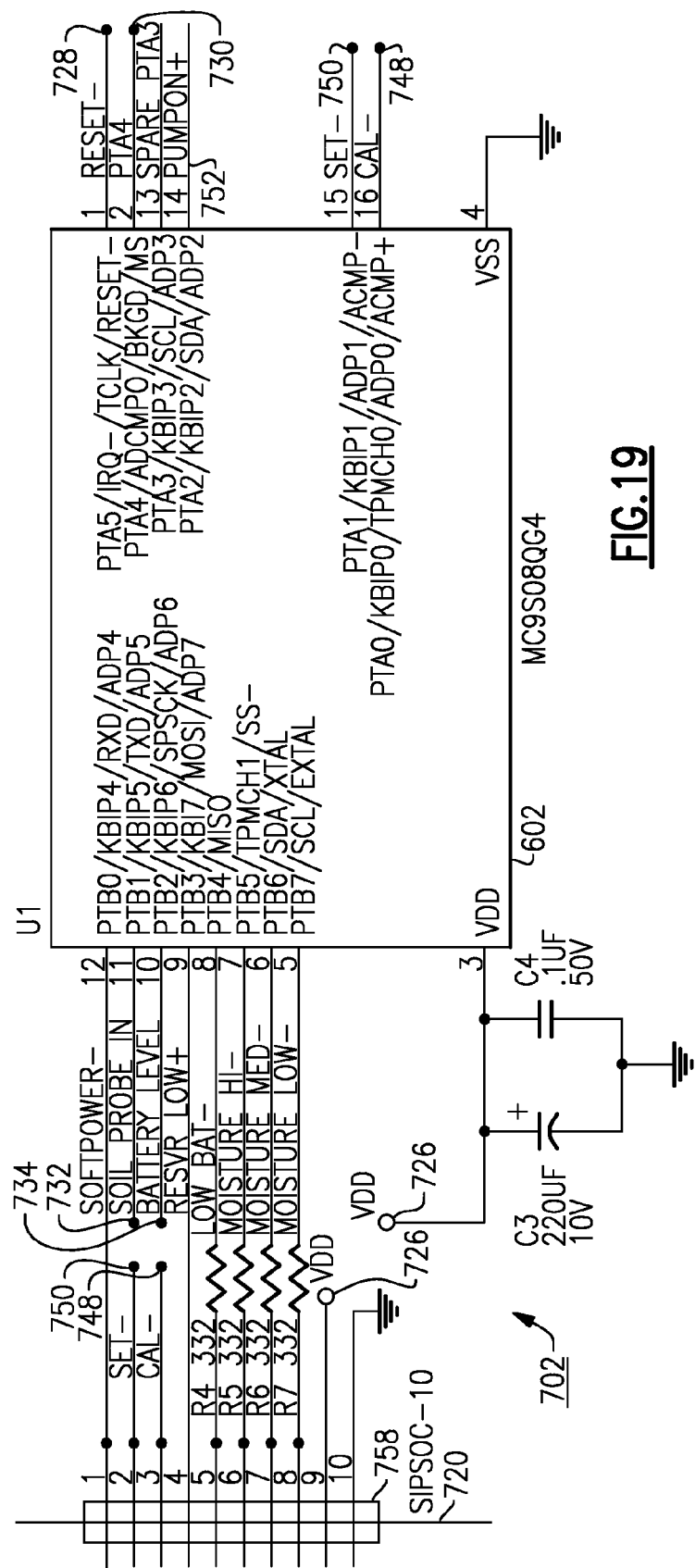
FIG. 19 is a schematic of a portion of the circuitry of the fourth embodiment PWS.

As shown in FIG. 19, the first circuitry portion includes the microcontroller which is preferably an HCS08 microcontroller model number MC9S08QG4 (Freescale Semiconductor Inc. of Austin, Tex.). The first circuitry portion also includes the i/o bus which is used to transmit user input from the switches to the microcontroller and indicator light output from the microcontroller to the indicator LEDs. As shown in FIG. 19, connector hardware 758 may be used to help connect these signals across the i/o interface.

Figure 20:
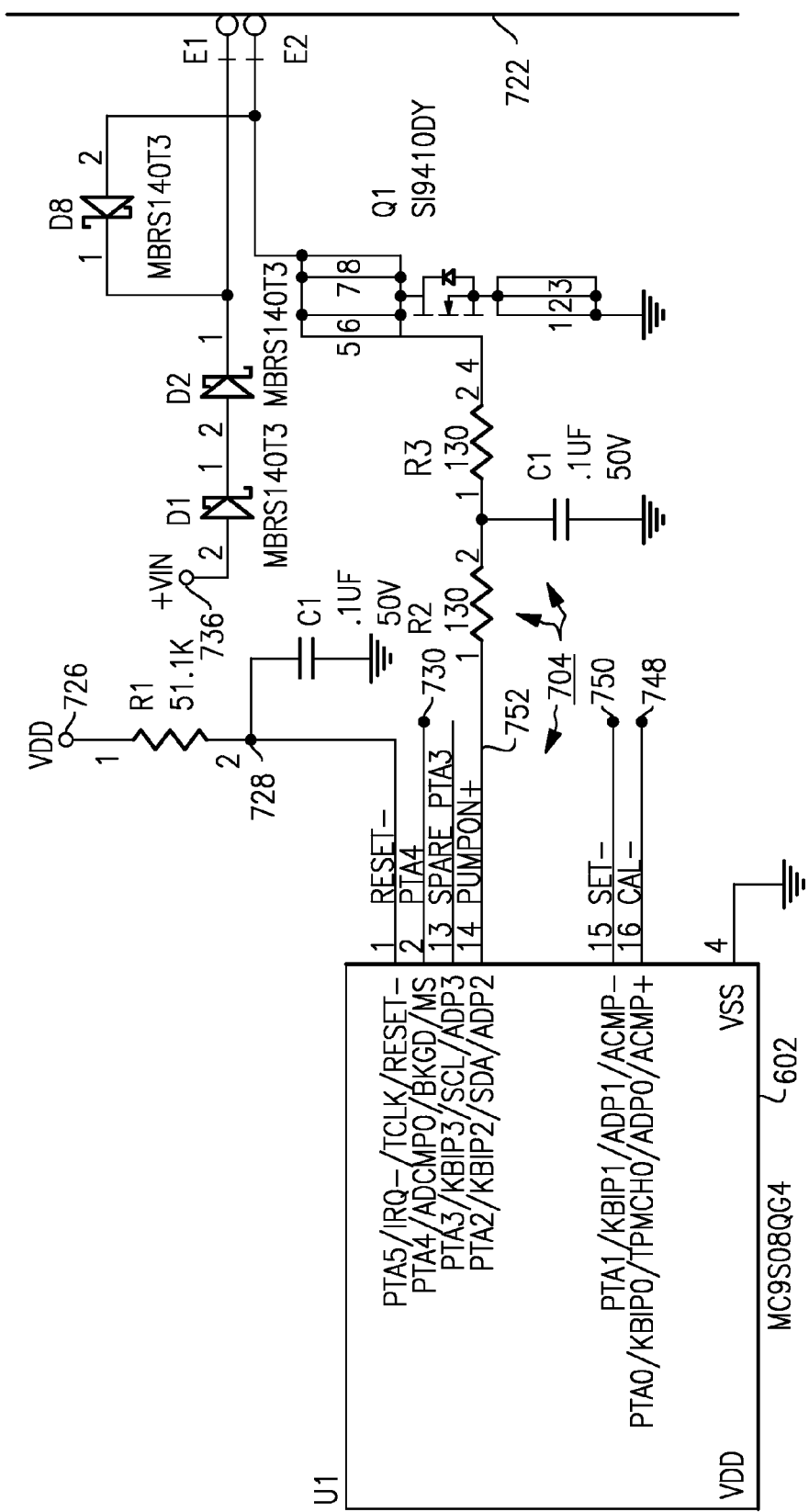
FIG. 20 is a schematic of a portion of the circuitry of the fourth embodiment PWS.

As shown in FIG. 20, the second circuitry portion includes the pump control signal transmission line 752, which is used by the microcontroller to control on and off operation of the pump based on timers, inputs from the user, inputs from the soil moisture probe, inputs from the water level detector and/or inputs from the battery level detector according to hardware and/or software built and/or programmed into microcontroller 602.

Figure 21:
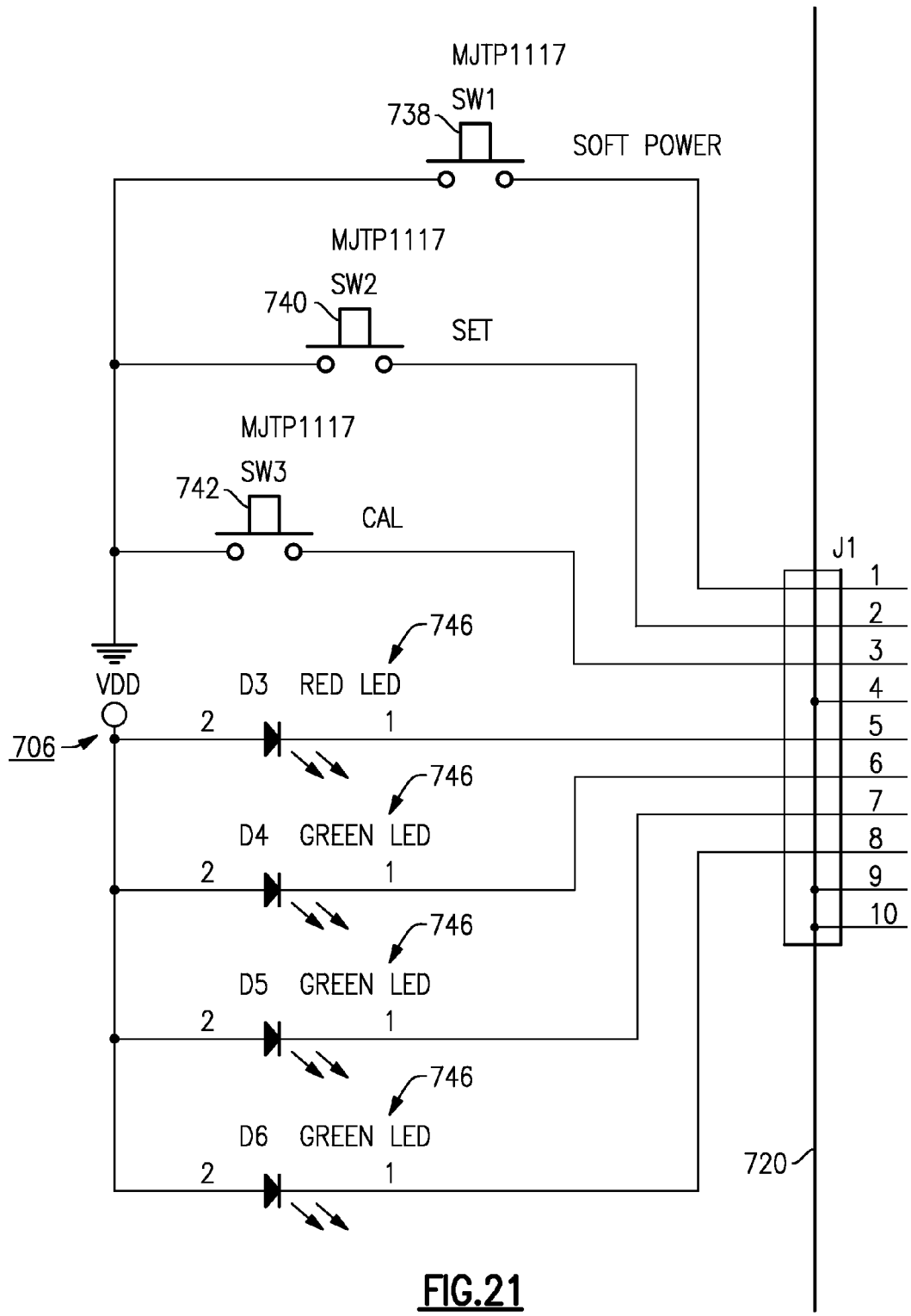
FIG. 21 is a schematic of a portion of the circuitry of the fourth embodiment PWS.

As shown in FIG. 21, the third circuitry portion includes the soft power switch (for example, a push button switch) that can be actuated by the user to turn the PWS 600 on and off. The third circuitry portion further includes the calibration switch that can be actuated by the user to calibrate the PWS 600. Preferably, when the user actuates the calibration switch (for example, a push button switch) the computer measures the voltage across the soil moisture probe and stores the result as a reference level. Comparisons to future soil moisture probe voltage readings can be made to this stored reference level. As shown in FIG. 21, and as discussed above, the indicator LEDs correspond to low reservoir level, "more wet" soil moisture level, "more dry" soil moisture level and "medium" soil moisture level. There may also be an additional indicator for low battery level. The switches and lights of the third circuitry portion are preferably located on control panel 670.

Figure 22:
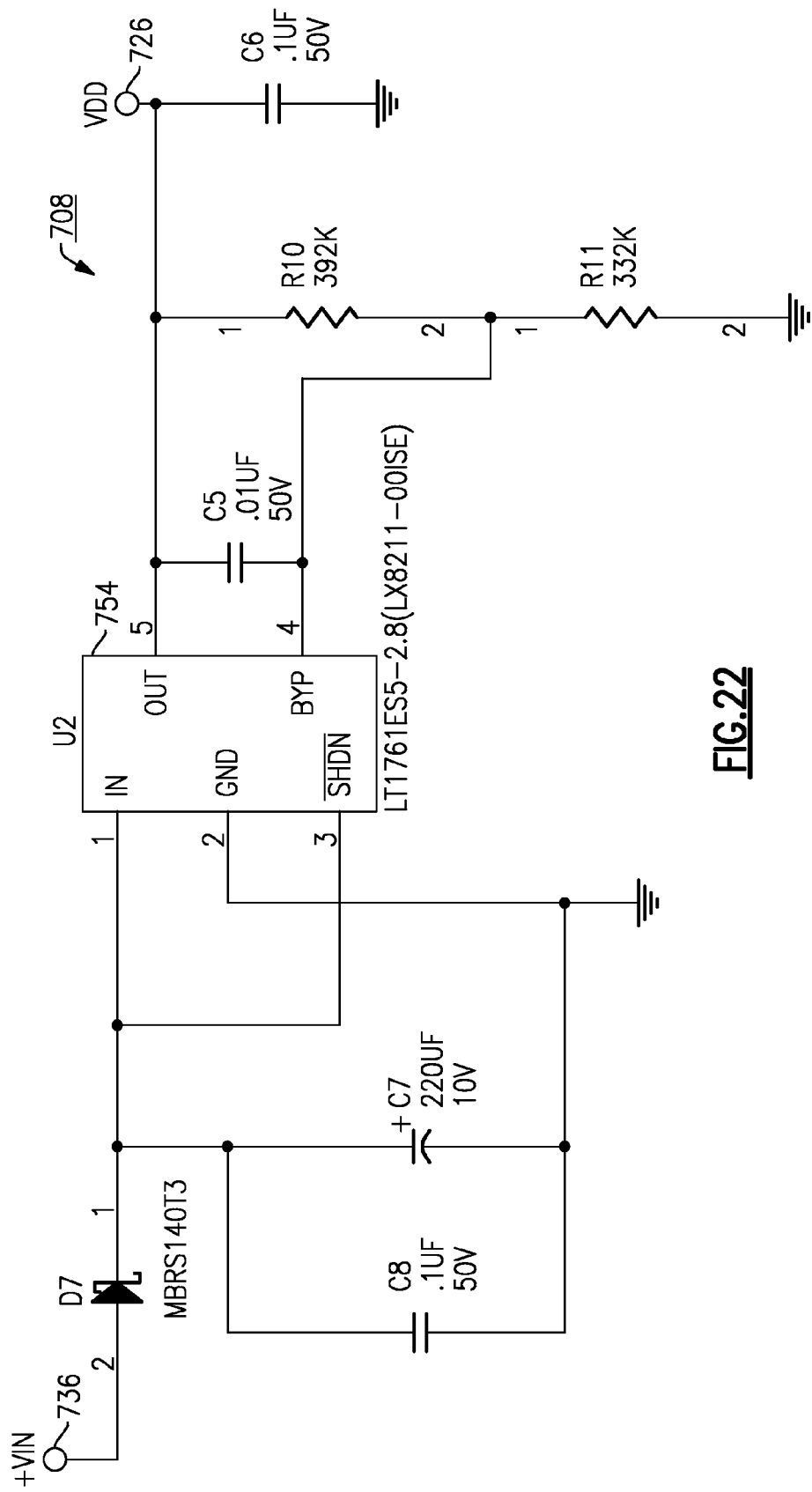
FIG. 22 is a schematic of a portion of the circuitry of the fourth embodiment PWS.

As shown in FIG. 22, the fourth circuitry portion includes the regulator which conditions power received from the power source (for example, battery 610) at the power in ref pt and outputs the appropriately conditioned power to the positive voltage supply ref pt. The regulator is preferably model number LT1761ES5-2.8 (LX8211-00ISE) (Linear Technology of Milpitas, California).

Figure 23:
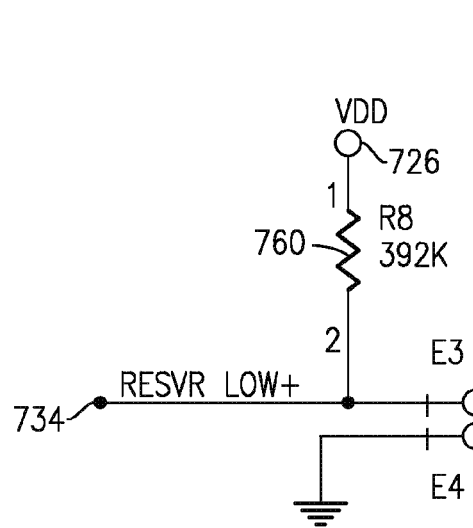
FIG. 23 is a schematic of a portion of the circuitry of the fourth embodiment PWS.

As shown in FIG. 23, the fifth circuitry portion includes the soil probe ref pt, which corresponds to the voltage across the electrodes of the soil moisture probe. The soil probe ref pt can be considered as a middle point of a voltage divider between the high voltage of the positive voltage supply ref pt and the ground of the grounded electrode. When the soil, in which the soil moisture probe is inserted, is dry, and non-conductive with a large electrical resistance, the soil moisture ref pt will be close to the positive voltage supply ref pt as most of the voltage drop will occur across the dry soil between the soil probe ref pt and ground. This means that the soil moisture ref pt signal will be detected by the microcontroller to have a high status corresponding to dry soil. On the other hand, when the soil is moist with an electrically conductive fluid, such as $H_2O$, then the voltage will drop more across resistor 762 and less between the conductors. This means that the conductor electrically connected to the soil moisture ref pt will be at a voltage much closer to ground level. This means that the soil moisture ref pt signal will be detected by the microcontroller to have a low status corresponding to moist soil. When the soil is in an intermediate state between wet and dry, then the soil moisture ref pt voltage will be at an intermediate voltage level. Users can calibrate what is considered to be an intermediate moisture level (preferably depending on the type of plants being watered) using the calibration switch. The calibration switch is preferably a user actuatable push-button switch.

As shown in FIG. 23, the fifth circuitry portion includes the reservoir low ref pt, which corresponds to the voltage across two electrodes of the water level detector that are located in the interior space of the reservoir tank. The reservoir low ref pt can be considered as a middle point of a voltage divider between the high voltage of the positive voltage supply ref pt and the ground of the grounded electrode. When the reservoir tank, in which the water level detector is inserted, is below the level of the electrodes of the water level detector, then the space between these electrodes will be filled with air and electrically resistive. This means that the reservoir low ref pt will be close to the voltage level of the positive voltage supply ref pt as substantially all the voltage will drop across the empty air between the electrodes. This means that the reservoir low ref pt signal will be detected by the microcontroller to have a high status corresponding to a low reservoir water level. On the other hand, when the reservoir tank is filled above the level of the electrodes of the water level detector, then the voltage will drop mostly across resistor 760 and much less between the electrodes across the water between the electrodes. This means that the electrode electrically connected to the reservoir low ref pt will be at a voltage close to ground level. This means that the reservoir low ref pt signal will be detected by the microcontroller to have a low status corresponding to an at least somewhat filled reservoir. Alternatively, additional resistance detectors can be placed at various heights in the reservoir to get more refined information on the water level in the reservoir.

Figure 24:
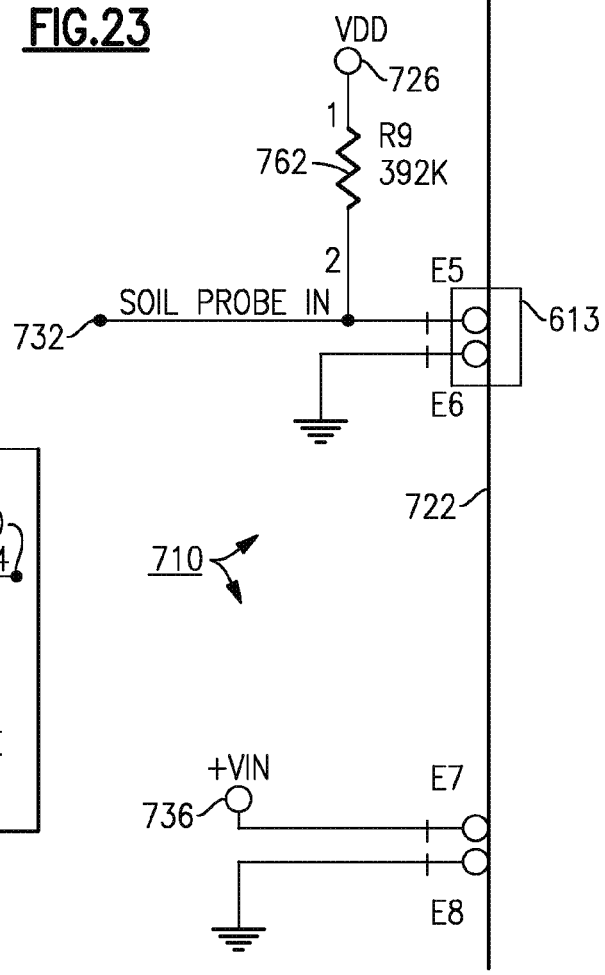
FIG. 24 is a schematic of a portion of the circuitry of the fourth embodiment PWS.
Figure 24:
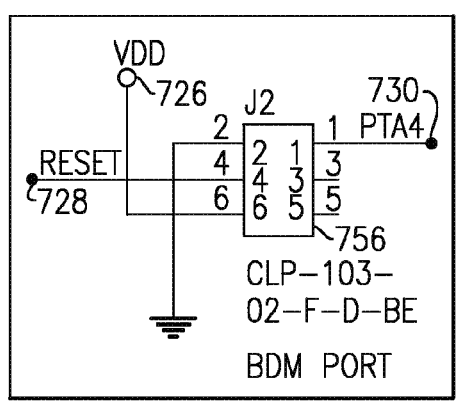

As shown in FIG. 24, the sixth circuitry portion includes the socket strip 756 which is preferably socket strip model number CLP-103-02-F-D-BE (Samtech Inc. of New Albany, Indiana).

In an alternative embodiment the soil probe acts as a resistor to the ground in the voltage divider circuit. The onboard A/D converter measures the center of the voltage divider. The trip point is established when the "SET" button is pressed. When the "SET" button is pressed the A/D converter reads the voltage at the center of the voltage divider, which is then the "SETPOINT". The "SET" operation can be accomplished at any point in the process or operation of the system.

7. Fifth Embodiment: PWS with Umbrella

A canopied embodiment of a PWS assembly 800 according to the present invention will now be described with reference to FIG. 25. Assembly 800 includes: plant watering sub-system 600; hollow tube hangers 802; water collectors 804; umbrella 806; and hanger 808.

Plant watering plant subsystem 600 has been explained above and preferably forms a part of this preferred embodiment of the present invention as well. The hollow tube hangers are attached at hanger apertures 611 at one end and to the water collectors at the other end. The water collectors are also attached to the umbrella. The umbrella is attached to and supported by the hanger. The hanger is hung from a support structure (not shown), such as a hook hung from a tree or porch beam. Preferably, assembly 800 is hung out of doors for reasons that will now be explained.

The umbrella preferably serves as the pot hanger, although it is noted that the hanger may be omitted in embodiments where subsystem 600 is designed to be placed on and supported by the floor and/or the ground. The umbrella prevents rain from over-watering the plant allowing the plant watering subsystem complete control over the plant watering process. The umbrella collects rainwater and diverts it, under the influence of gravity, into the reservoir through the water collectors, the hollow hangers, and appropriate inlet(s) such as reservoir fluid inlet 607 (discussed above). The umbrella 4 is preferably made from transparent materials which will allow UV light to reach the plant, but filter out harmful heat-producing IR light, giving the plant an ideal environment. The hanger, umbrella, water collectors and hollow hangers could be sold as an option or bundled with the plant watering subsystem itself.

Many variations are possible. For example, the umbrella could be made relatively opaque for plants that do not thrive on direct sunlight. Also, the rainwater collection hardware may be omitted in some embodiments, which would still provide the light control and thermal control associated with the umbrella. Also, different plant watering subsystems, now known or to be developed in the future, could be substituted for subsystem 600. However, it is highly preferred that the plant watering subsystem be automatically self-watering because otherwise the plant is likely to dry out absent the rainwater diverted away by the umbrella.

DEFINITIONS

The following definitions are provided to facilitate claim interpretation and claim construction:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Plant Watering System or PWS: any system that automatically provides fluid to plants without direct user intervention; some exemplary examples of systems that are not PWSs: (i) a conventional lawn sprinkler is not a PWS because a user must turn the hose on and off to directly control the water supply, (ii) a conventional terra cotta flowerpot and watering can are not a PWS because the user must fill the can and pour the water, and (iii) a planter left out in the rain is not a PWS because direct natural precipitation cannot be considered as automatic provision of water; some exemplary examples of systems that are PWSs: (i) an irrigation system that is fed by a river and runs by timers, (ii) a planter that feeds fluid from a reservoir to the soil by wicking, (iii) a planter that feeds fluid from a reservoir to the soil by vacuum or pressure means (not directly actuated by the user), and (iv) a planter that feeds fluid from a reservoir to a planter by means of a soil moisture feedback controlled electric pump; PWSs where the plants are planted directly in the Earth may be herein referred to as "irrigation type PWSs", but most PWSs according to the present invention will include a containers for the plants which is herein referred to as a "planter."

Electrically Connected: means either directly electrically connected, or indirectly electrically connected, such that intervening elements are present; in an indirect electrical connection, the intervening elements may include inductors and/or transformers.

Directly Electrically Connected: electrically connected without any intervening elements that substantially change the electrical characteristics of the electrical energy and/or signal passing between the directly electrically connected elements.

Battery: may include one or more electrochemical cells of any type(s) now known or to be developed in the future.

Effectively determine: to determine directly or indirectly; for example, determination of voltage at two points in a linear circuit can be used to effectively determine the resistance between the two points, even if actually resistance values, in units of electrical resistance such as ohms, is never actually computed as such.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

It will be apparent to one of skill in the art that described herein is a novel plant watering system. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. An apparatus for providing fluid to plants planted in soil, the apparatus comprising:
   a fluid providing structure adapted to selectively provide fluid to the soil;
   a probe structure, comprising an end, a first conductor including a first conductor portion and a second conductor comprising a second conductor portion, the probe structure being adapted to maintain the first conductor portion and the second conductor portion in a spaced apart relationship proximate to the end so that soil surrounds the first conductor portion and the second conductor portion when the end of the probe structure is placed in the soil;
   a first resistance measuring structure adapted to effectively determine the electrical resistance between the first conductor portion and the second conductor portion of the probe when placed in soil;
   a reservoir structure adapted to hold fluid away from the soil, the reservoir structure having a reservoir level detector and a second resistance measuring structure adapted to effectively determine a reservoir water level;
   an input structure adapted to allow a user to choose a calibration point in time;
   an indicator structure adapted to indicate the information about soil moisture level to users, the indicator structure having a first light and a second light,
   a computer having a microcontroller and a controller structure connected thereto, the computer programmed with instructions to operate the controller structure to:
      control the selective provision of fluid by the fluid providing structure,
      at the calibration point, control the resistance measuring structure to effectively determine a calibration resistance to be received by and stored in the controller structure,
      subsequent to the calibration point, control the resistance measuring structure to effectively determine a subsequent resistance to be received by the controller structure,
      compare the subsequent resistance to the calibration resistance to determine information about the soil moisture level,
      controls the second resistance measuring structure to effectively determine a reservoir resistance and compares the reservoir resistance to a predetermined threshold value to determine whether the fluid level in the reservoir is low;
   the computer further programmed to operate the controller structure to control the first light to be on when the comparison operation determines that the subsequent resistance is greater than the calibration resistance by at least a predetermined first threshold amount; and
   the computer further programmed to operate the controller structure to control the second light to be on when the comparison operation determines that the subsequent resistance is less than the calibration resistance by at least a predetermined second threshold amount.

2. The apparatus of claim 1 wherein the probe structure further comprises:
   a rigid frame, with the first conductor and the second conductor are affixed to the frame portion to maintain the spaced apart relationship between the first conductor portion and the second conductor portion;
   a flexible cable mechanically connected to the frame and electrically connected to at least the first conductor structure; and
   a probe connector mechanically connected to the cable and electrically connected to at least the first conductor, with the connector portion being adapted to be detachably electrically connectable to mating connectors.

3. The apparatus of claim 1 wherein:
   the end of the probe structure is substantially cylindrical in shape comprising a peripheral exterior surface and defining a central axis;
   the first connector portion is substantially shaped as a band around the peripheral exterior surface of the end; and
   the second connector portion is shaped as a band around the peripheral exterior surface of the end spaced apart from the first connector portion along the direction of the central axis.

4. The apparatus of claim 1 wherein the fluid providing structure comprises:
   a fluid conduit structure adapted to guide fluid from the reservoir structure to the vicinity of the soil; and
   a pump structure adapted to selectively pump fluid through the fluid conduit structure under control of the controller structure.

5. The apparatus of claim 4 wherein the reservoir structure is shaped to extend at least partially around a peripheral wall of a flowerpot.

6. The apparatus of claim 5 further comprising:
a substantially fluid tight pump chamber located beneath the reservoir structure and defining an interior space; and
a battery electrically connected to the pump structure and adapted to provide electrical power to the pump structure to power the pumping operation of the pump structure;
wherein the pump structure and the battery being located within the interior space of the pump chamber.

7. The apparatus of claim 5 further comprising an umbrella adapted and located to substantially prevent precipitation from falling on the plants in the soil of the apparatus.

8. The apparatus of claim 1 wherein the user input structure is a user actuatable switch electrically connected to the controller structure.

9. The apparatus of claim 1 wherein the resistance measuring structure comprises:
a voltage source structure electrically connected to at least the first conductor and adapted to cause a voltage difference between first conductor and the second conductor.

10. The apparatus of claim 9 wherein the resistance measuring structure further comprises:
a resistor electrically connected in series between the voltage source structure and the first conductor; and
a voltage detector structure adapted to determine a voltage level of the first conductor in order to effectively determine the resistance between the first conductor portion and the second conductor portion.

11. The apparatus of claim 10 wherein:
the second conductor is electrically connected to an electrical ground; and
the first conductor will have a voltage level close to ground level when the soil is moist; and
the first conductor will have a voltage level close to the level of the voltage supply structure when the soil is dry.

12. The apparatus of claim 9 wherein the voltage supply structure comprises:
a battery; and
voltage regulation circuitry electrically connected to the battery and the first connector structure.

13. The apparatus of claim 1 wherein the controller structure is further adapted to control the fluid providing structure to provide fluid to the soil when the comparison operation determines that the subsequent resistance is greater than the calibration resistance by at least a predetermined threshold amount.

14. The apparatus of claim 13 wherein the predetermined threshold amount is zero.

15. The apparatus of claim 13 wherein the controller structure further comprises a timer structure adapted to measure intervals of time and the point in time at which the subsequent resistance is controlled to be effectively determined by the resistance measuring structure at a predetermine interval of time measured by the timer structure.

16. The apparatus of claim 1 wherein the controller structure comprises at least a portion of the microcontroller.

17. The apparatus of claim 1 wherein:
the predetermined first threshold amount is zero; and
the predetermined second threshold amount is zero.

* * * * *